United States Patent
Ng et al.

(10) Patent No.: US 9,439,049 B2
(45) Date of Patent: Sep. 6, 2016

(54) SYSTEM AND METHOD FOR MESSAGE SERVICE GATEWAY

(75) Inventors: Kam-Hon Ng, San Ramon, CA (US); Marina E. Giverts, Alamo, CA (US); Steven J. Dantzer, Albany, CA (US)

(73) Assignee: Sybase, Inc., Dublin, CA (US)

( * ) Notice: Subject to any disclaimer, the term of this patent is extended or adjusted under 35 U.S.C. 154(b) by 244 days.

(21) Appl. No.: 13/359,956

(22) Filed: Jan. 27, 2012

(65) Prior Publication Data

US 2013/0196627 A1   Aug. 1, 2013

(51) Int. Cl.
| | |
|---|---|
| *H04W 4/00* | (2009.01) |
| *H04W 4/14* | (2009.01) |
| *H04L 12/58* | (2006.01) |
| *H04W 4/18* | (2009.01) |
| *H04W 12/06* | (2009.01) |
| *H04L 29/06* | (2006.01) |

(52) U.S. Cl.
CPC ............... *H04W 4/14* (2013.01); *H04L 51/36* (2013.01); *H04L 69/08* (2013.01); *H04W 4/18* (2013.01); *H04W 12/06* (2013.01)

(58) Field of Classification Search
CPC ....... H04W 4/001; H04W 4/06; H04W 4/12; H04W 4/14
See application file for complete search history.

(56) References Cited

U.S. PATENT DOCUMENTS

| | | | |
|---|---|---|---|
| 2005/0003838 A1* | 1/2005 | McCann ................. | H04W 4/14 455/466 |
| 2006/0167699 A1* | 7/2006 | Rontynen et al. ................. | 705/1 |
| 2007/0073808 A1* | 3/2007 | Berrey et al. ................. | 709/204 |
| 2009/0203390 A1* | 8/2009 | Bradbury ............. | G06Q 10/107 455/466 |
| 2011/0053618 A1* | 3/2011 | Lin et al. ...................... | 455/466 |

* cited by examiner

*Primary Examiner* — San Htun

(74) *Attorney, Agent, or Firm* — Sterne, Kessler, Goldstein & Fox P.L.L.C.

(57) ABSTRACT

A flexible, extensible, and dynamically configurable message service gateway that offers inter alia a façade through which a Content Provider (CP), among others, may invoke services to simply and easily complete among other things opt-in and opt-out activities in connection with a CP campaign or initiative. Among other things such a façade may hide various of the complexities, technical aspects, etc. of different communication paradigms including for example Short Message Service, Multimedia Message Service, Internet Protocol Multimedia Subsystem, Wireless Application Protocol, Electronic Mail, Instant Messaging, Unstructured Supplementary Service Data, etc. Such a façade may be offered by a centrally-located, full-featured Messaging Inter-Carrier Vendor.

20 Claims, 15 Drawing Sheets

SYSTEM AND METHOD FOR MESSAGE SERVICE GATEWAY

BACKGROUND

1. Field of the Invention

The present invention relates generally to telecommunications services. More particularly, the present invention relates to capabilities that enhance substantially the value and usefulness of various communication paradigms including, inter alia, Short Message Service (SMS), Multimedia Message Service (MMS), Internet Protocol (IP) Multimedia Subsystem (IMS), Wireless Application Protocol (WAP), Electronic Mail (E-Mail), Instant Messaging (IM), Unstructured Supplementary Service Data (USSD), etc.

2. Background of the Invention

As the 'wireless revolution' continues to march forward through various flavors of 2G, 3G, 4G, and beyond, the importance to a Mobile Subscriber (MS)—for example a user of a Wireless Device (WD) that is serviced by possibly inter alia a Wireless Carrier (WC)—of their WD grows substantially. Examples of WDs include, possibly inter alia, mobile telephones, smart phones, handheld computers, Internet-enabled phones, pagers, radios, TVs, audio devices, car audio (and other) systems, recorders, text-to-speech devices, bar-code scanners, net appliances, mini-browsers, personal data assistants (PDAs), etc.

One consequence of such a growing importance is the resulting ubiquitous nature of WDs—i.e., MSs carry them at almost all times and use them for an ever-increasing range of activities. For example, MSs employ their WDs to, possibly inter alia:

1) Exchange messages with other MSs (e.g., "Let's meet for dinner at 6") through Peer-to-Peer, or P2P, messaging.

2) Secure information (such as, for example, weather updates, travel alerts, news updates, sports scores, etc.), participate in voting initiatives (such as, for example, with the television show American Idol®), interact with social networking sites, etc. through an Application-to-Peer, or A2P, campaign, initiative, etc. as offered by a Content Provider (CP).

3) Engage in for example Mobile Commerce (which, broadly speaking, encompasses the buying and selling of merchant-supplied products, goods, and services through a WD) and Mobile Banking (which, broadly speaking, encompasses performing various banking activities through a WD).

During participation in a CP A2P campaign, initiative, etc. a MS may need to complete one or more opt-in and/or opt-out activities. For example:

1) An opt-in process may among other things confirm, ensure, etc. that a MS does indeed wish to participate in a CP campaign, initiative, etc. and among other things receive, and possibly pay for, any (SMS, MMS, IMS, etc.) messages that may be sent to their WD in connection with the campaign, initiative, etc.

2) An opt-out process may among other things confirm, ensure, etc. that a MS does indeed wish to end their participation in a CP campaign, initiative, etc. to which the MS had previously opted-in.

Opt-in and opt-out processes can be complicated, involved, etc. and among other things may necessitate an understanding of, involvement by, etc. a CP in the technical aspects of the world of (SMS, MMS, IMS, etc.) messaging. This can represent a significant challenge for a CP since CPs frequently do not have such technical expertise.

What is needed is a flexible, extensible, dynamically configurable, etc. message service gateway that offers inter alia a façade through which a CP, among others, may simply and easily complete among other things opt-in and opt-out activities. Such a façade may inter alia hide various of the complexities, technical aspects, etc. of (SMS, MMS, IMS, etc.) messaging.

Aspects of the present invention fills the lacuna that was noted above by (1) providing aspects of a message service gateway while (2) addressing, in new and innovatory ways, various of the not insubstantial challenges that are associated with same.

SUMMARY OF THE INVENTION

In one embodiment of the present invention there is provided a server-based method for transiting an SMS message comprising (1) receiving, via a first protocol, a service invocation (i.e., an invocation of one of a plurality of services that is offered through a façade) including among other things one or more service arguments and (2) completing a plurality of processing steps including at least (a) validating aspects of the service arguments, (b) examining aspects of the service arguments to at least identify a destination WC, and (c) transiting at least aspects of the SMS message, via a second protocol that is different than the first protocol, towards the destination WC.

In another embodiment of the present invention there is provided a processor-based system on a server that is configured to transit an SMS message, the processor-based system comprising (1) a façade through which one or more services is offered, via a first protocol, with each of the offered services accepting one or more arguments, (2) workflow modules configured to perform a plurality of processing steps, responsive to invocation of one of the offered services, including at least (a) validating aspects of the service arguments and (b) examining aspects of the service arguments to at least identify a destination WC, and (3) a gateway for transiting at least aspects of the SMS message, via a second protocol that is different that the first protocol, towards the destination WC.

Further features and advantages of the present invention, as well as the structure and operation of various embodiments thereof, are described in detail below with reference to the accompanying drawings. It should be noted that the invention is not limited to the specific embodiments described herein. Such embodiments are presented herein for illustrative purposes only. Additional embodiments will be readily apparent to persons skilled in the relevant arts based on the teachings contained herein.

BRIEF DESCRIPTION OF THE DRAWINGS

The accompanying drawings, which are incorporated herein and form part of the specification, depict embodiments of the present invention and, together with (1) the summary that was presented above and (2) the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

Figure 1:
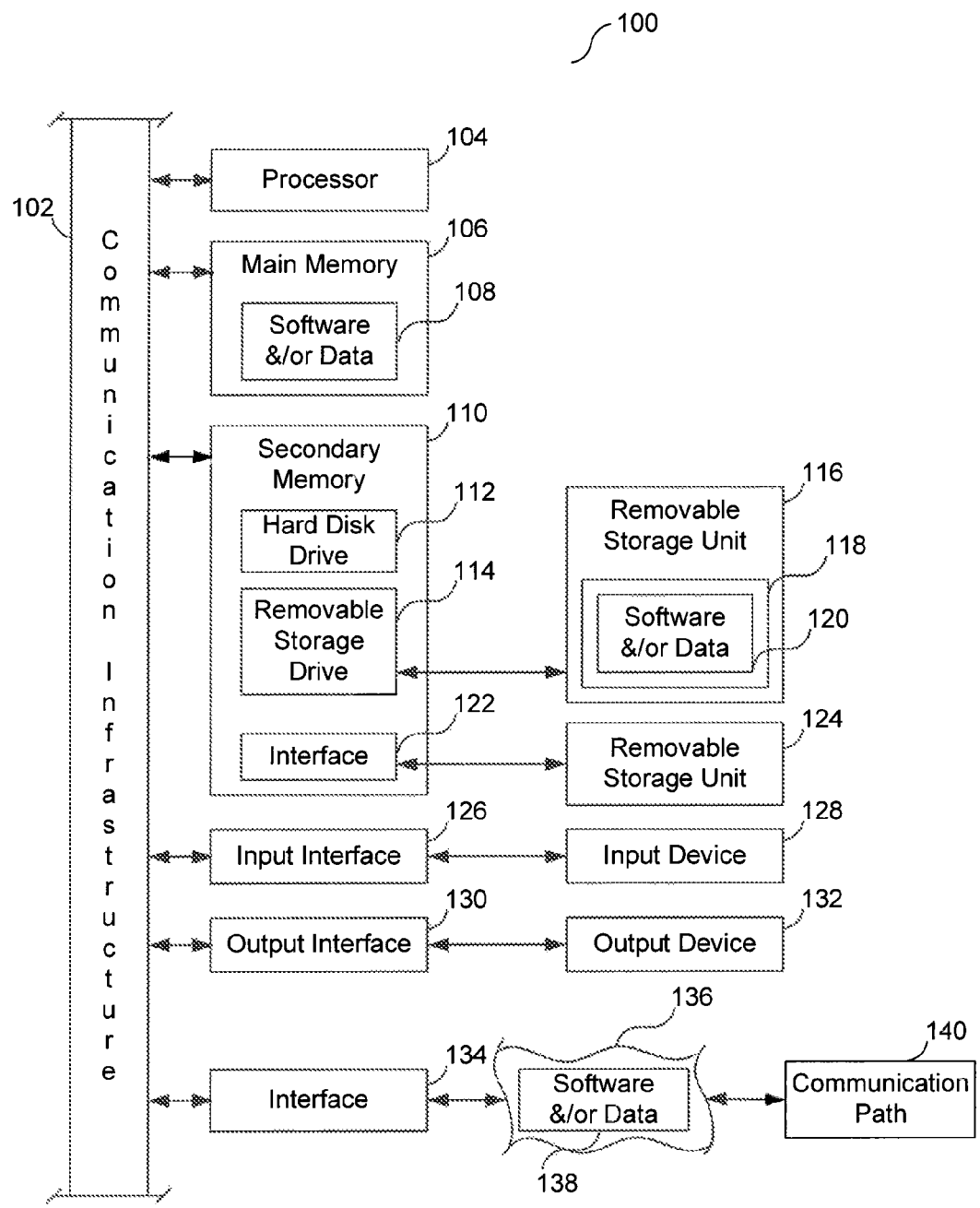
FIG. 1 depicts an exemplary computer system through which embodiments of aspects of the present invention may be implemented.

Throughout the drawings (a) like reference numbers generally indicate identical, functionally similar, and/or structurally similar elements and (b) the left-most digit(s) of a reference number generally identify the drawing in which the reference number first appears. For example, in FIG. 6 reference numeral 420 would direct the reader to FIG. 4 for the first appearance of that element.

It will be understood that the drawings identified above depict embodiments of the invention. Variations of these embodiments will be readily apparent to persons skilled in the relevant art(s) based on the teachings contained herein.

The features and advantages of the present invention will become more apparent from the detailed description set forth below when taken in conjunction with the above identified drawings.

DETAILED DESCRIPTION OF THE INVENTION

Embodiments of the present invention are described herein in the context of a method and apparatus for aspects of a message service gateway. Those of ordinary skill in the relevant art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings and as described below.

In the interest of clarity, not all of the routine features of the implementations described herein are shown and described. It will, of course, be appreciated that in the development of any such actual implementation numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The following detailed description of the present invention refers to the accompanying drawings that illustrate exemplary embodiments consistent with this invention. Other embodiments are possible, and numerous modifications can be made to the embodiments within the spirit and scope of the invention. Therefore, the detailed description is not meant to limit the invention.

Note that in this description references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

Aspects of the present invention may be implemented by any combination of one or more of software, firmware, hardware, etc. FIG. 1 illustrates an example computer system 100 in which the present invention or portions thereof (such as for example described below) can be implemented as computer-readable code. Various embodiments of the invention are described in terms of this example computer system 100. After reading this description, it will become apparent to a person skilled in the relevant art how to implement the invention using other computer systems and/or computer architectures.

Computer system 100 includes one or more processors, such as processor 104. Processor 104 can be a special purpose processor or a general purpose processor. Processor 104 is connected to possibly among other things a communication infrastructure 102 (for example, a bus or a network).

Computer system 100 also includes a main memory 106, preferably Random Access Memory (RAM), containing possibly inter alia computer software and/or data 108.

Computer system 100 may also include a secondary memory 110. Secondary memory 110 may include, for example, a hard disk drive 112 (having stored therein possibly inter alia computer software and/or data), a removable storage drive 114, a memory stick, etc. A removable storage drive 114 may comprise a floppy disk drive, a magnetic tape drive, an optical disk drive, a flash memory, or the like. A removable storage drive 114 reads from and/or writes to a removable storage unit 116 in a well known manner. A removable storage unit 116 may comprise a floppy disk, magnetic tape, optical disk, etc. which is read by and written to by removable storage drive 114. As will be appreciated by persons skilled in the relevant art(s) removable storage unit 116 may include a computer usable storage medium 118 having stored therein possibly inter alia computer software and/or data 120.

In alternative implementations, secondary memory 110 may include other similar means for allowing computer programs or other instructions to be loaded into computer system 100. Such means may include, for example, a removable storage unit 124 and an interface 122. Examples of such means may include a program cartridge and cartridge interface (such as that found in video game devices), a removable memory chip (such as an Erasable Programmable Read-Only Memory [EPROM], or Programmable Read-Only Memory [PROM]) and associated socket, and other removable storage units 124 and interfaces 122 which allow computer software and/or data to be transferred from the removable storage unit 124 to computer system 100.

Computer system 100 may also include an input interface 126 and a range of input devices 128 such as, possibly inter alia, a keyboard, a mouse, a track ball, a pointing device, etc.

Computer system 100 may also include an output interface 130 and a range of output devices 132 such as, possibly inter alia, a display monitor, one or more speakers, a printer, etc.

Computer system 100 may also include a communications interface 134. Communications interface 134 allows computer software and/or data 138 to be transferred between computer system 100 and external devices. Communications interface 134 may include inter alia a modem, a network interface (such as inter alia an Ethernet card), a communications port, a Personal Computer Memory Card International Association (PCMCIA) slot and card, or the like. Computer software and/or data 138 transferred via communications interface 134 are in the form of signals 136 which may be electronic, electromagnetic, optical, or other signals capable of being received by communications interface 134. These signals 136 are provided to communications interface 134 via a communications path 140. Communications path 140 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 116, removable storage unit 124, and a hard disk installed in hard disk drive 112. Signals carried over communications path 140 can also embody the logic described herein. Computer program medium and computer usable medium can also refer to memories, such as main memory 106 and secondary memory 110, which can be memory semiconductors (e.g. Dynamic Random Access Memory [DRAM] elements, etc.). These computer program products are means for providing computer software to computer system 100.

Computer programs or software (also called computer control logic or instructions) are stored in main memory 106 and/or secondary memory 110. Computer programs may also be received via communications interface 134. Such computer programs, when executed, enable computer system 100 to implement the present invention as discussed herein. In particular, the computer programs, when executed, enable processor 104 to implement the processes of aspects of the present invention, such as for example the steps, activities, etc. that are discussed below. Accordingly, such computer programs represent controllers of the computer system 100. Where the invention is implemented using computer software, the computer software may be stored in a computer program product and loaded into computer system 100 using inter alia a removable storage drive 114, an interface 122, a hard drive 112 or a communications interface 134.

The invention is also directed to computer program products comprising computer program logic/instructions in the form of computer software stored on any computer useable medium. Such computer software, when executed in one or more data processing devices, causes the data processing device(s) to operate as described herein. Embodiments of the invention employ any computer useable or readable medium, known now or in the future. Examples of computer useable mediums include, but are not limited to, primary storage devices (e.g., any type of RAM), secondary storage devices (e.g., hard drives, floppy disks, Compact Disc Read-Only Memory [CD-ROM] disks, Zip disks, tapes, magnetic storage devices, optical storage devices, Microelectromechanical Systems [MEMS], nanotechnological storage device, etc.), and communication mediums (e.g., wired and wireless communications networks, local area networks, wide area networks, intranets, etc.).

When it is used within a (Local Area Network (LAN), Wide Area Network (WAN), etc.) networking environment, computer system 100 may be connected (by inter alia a wired connection or a wireless connection) to a network through a network interface or adapter (such as inter alia an Ethernet card) via communications interface 134. Under such a networked environment, computer programs (computer control logic) may be stored, either in whole or in part, on one or more remote memory storage devices (in addition to the previously noted main memory 106 and/or secondary memory 110).

Any apparatus or manufacture comprising a computer useable or readable medium having control logic (software) stored therein is referred to herein as a computer program product or program storage device. This includes, but is not limited to, the main memory 106, the secondary storage devices 110, the removable storage unit 116, and the carrier waves modulated with control logic 134. Such computer program products, having instructions (control logic) stored therein that, when executed by one or more data processing devices, cause such data processing devices to operate as described herein, represent embodiments of the invention.

Aspects of the present invention can work with software, hardware, and/or operating system implementations other than those described herein. Any software, hardware, and operating system implementations suitable for performing the functions described herein can be used.

Figure 2:
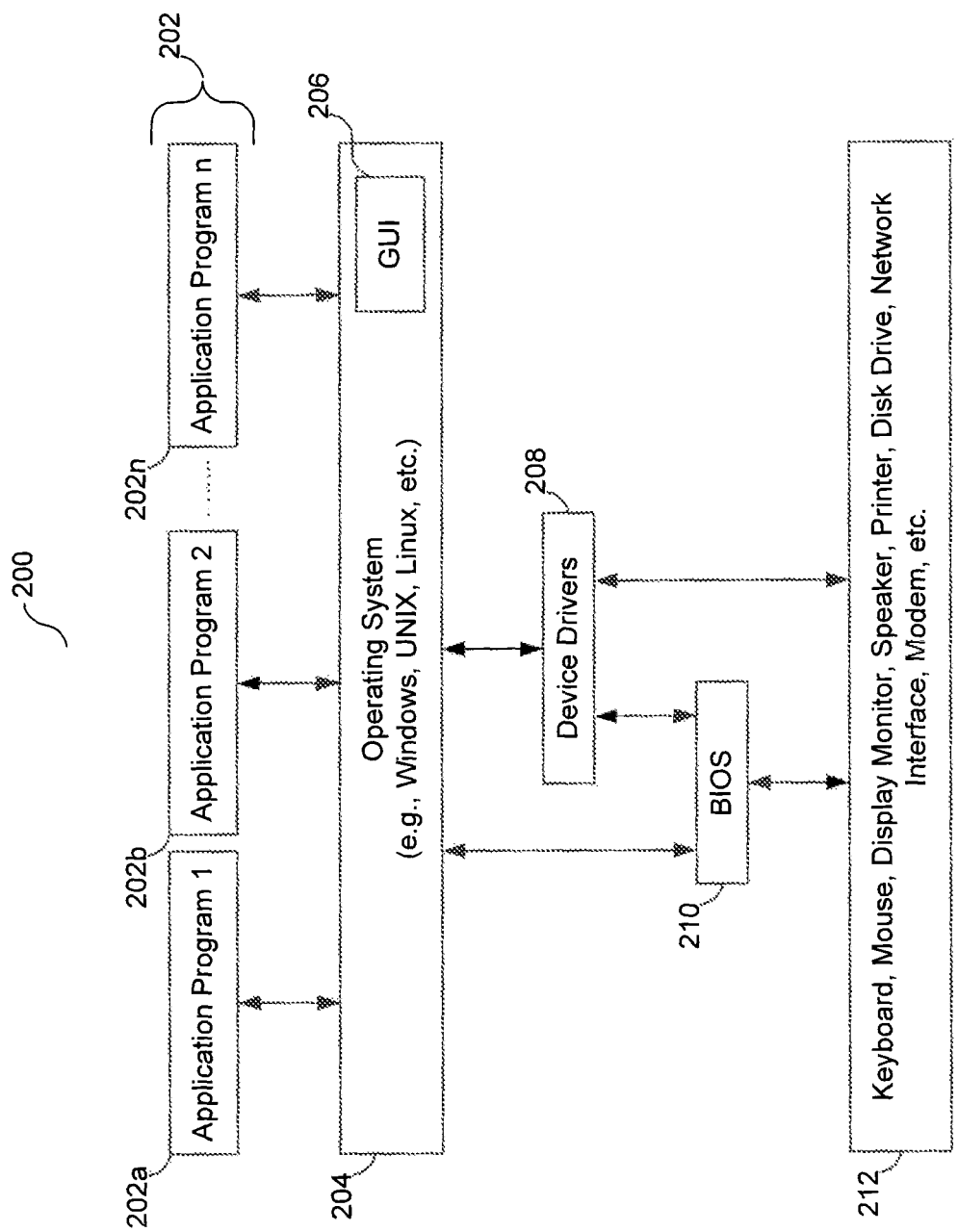
FIG. 2 illustrates an exemplary computer software environment that may among other things direct the operation of aspects of the computer system that was depicted in FIG. 1.

FIG. 2 illustrates a computer software environment 200 that inter alia may direct the operation of aspects of computer system 100. Computer software environment 200, which may be stored inter alia in main memory (e.g., RAM such as reference numeral 106 in FIG. 1) and/or on secondary storage (e.g., a hard disk drive such as reference numeral 112 in FIG. 1), includes inter alia an Operating System (OS) 204. The OS 204 manages low-level aspects of computer operation including inter alia managing the execution of processes, memory allocation, file Input and/or Output (I/O), and device I/O. One or more application programs, such as client application software or programs 202 (e.g., 202a, 202b, . . . 202n) may be loaded (e.g., transferred from storage (such as reference numeral 110 in FIG. 1) into main memory (such as reference numeral 106 in FIG. 1)) for execution by computer system 100. The applications or other software intended for use on computer system 100 may also be stored as a set of downloadable computer-executable instructions, for example, for downloading and installation from an Internet location (e.g., an application server, World Wide Web (WWW) server, etc.).

Computer software environment 200 may include inter alia a Graphical User Interface (GUI) 206 for receiving user commands and data in a graphical (e.g., a point-and-click) fashion. These inputs, in turn, may be acted upon by computer system 100 in accordance with instructions from the OS 204 and/or client application software 202. The GUI 206 also serves to display the results of operation from the OS 204 and client application software 202, whereupon the user may supply additional inputs or terminate the session. Commonly the OS 204 operates in conjunction with possibly inter alia device drivers 208 and the system Basic Input/Output System (BIOS) 210, particularly when interfacing with peripheral devices 212.

Popular examples of OS 204 include inter alia the different versions of Windows from Microsoft, the different versions of UNIX, the different versions of Linux, iOS from Apple, Android from Google, etc.

The above-described computer system and computer software environment were presented for purposes of illustrating the basic underlying WD, computer, PC, server, etc. components that may be employed for implementing aspects of the present invention. It will be readily apparent to one of ordinary skill in the relevant art that numerous other components and/or component arrangements are easily possible.

Figure 3:
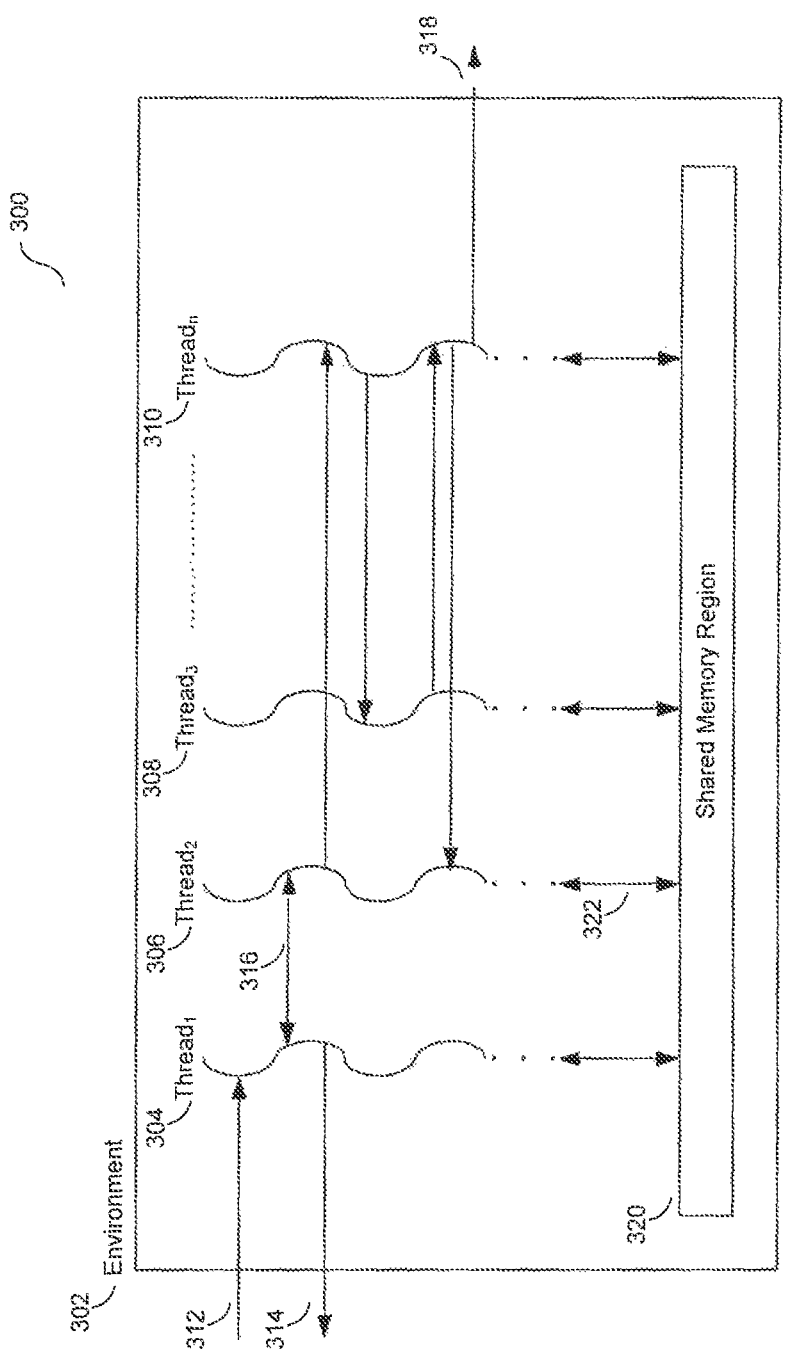
FIG. 3 depicts a portion of a hypothetical implementation that is possible under aspects of the present invention.

FIG. 3 and reference numeral 300 depict an environment 302 (e.g., implemented on or within, or containing aspects of, computer system 100 from FIG. 1 and possibly incorporating aspects of computer software environment 200 from FIG. 2) wherein possibly inter alia:

1) A dynamically adjustable number of threads (Thread$_1$ 304, Thread$_2$ 306, Thread$_3$ 308 ... Thread$_n$ 310) may be inter alia created, started, allowed to operate or execute, quiesced, stopped, destroyed, etc. under control of for example the environment 302. Among other things one or more threads may for example realize, support, etc. aspects of one or more elements of a MICV (such as for example WorkFlows, façade services, etc. as described below) and/or a single thread may for example realize aspects of one or more elements of a MICV (such as for example WorkFlows, façade services, etc. described below).

2) Among other things different elements of a MICV (such as described below) may communicate, interact, etc. with various of the threads (Thread$_1$ 304 ... Thread$_n$ 310) (see for example 312, 314, and 318).

3) Various of the threads (Thread$_1$ 304 ... Thread$_n$ 310) may among themselves communicate, interact, etc. (see for example 316).

4) Various of the threads (Thread$_1$ 304 ... Thread$_n$ 310) may communicate, interact, etc. with inter alia a Shared Memory Region (320) (see for example 322).

In the discussion below aspects of the present invention are described and illustrated as leveraging a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a discussion of the concept of a MICV, a summary of various of the services/functions/etc. that may be performed by a MICV, and a discussion of various of the advantages that may arise from same.

A MICV may, for example, be realized through any combination of, possibly inter alia, any one or more of (1) an element of a WC, an element of a landline carrier, or multiple such elements working together; (2) a Third-Party (3P) such as possibly inter alia a merchant, a CP, a financial institution, a Service Provider (SP, such as for example a hosting firm, etc.), etc.; (3) multiple 3P entities working together; (4) a service bureau; (5) a message service provider, and/or (6) other entities.

Figure 4:
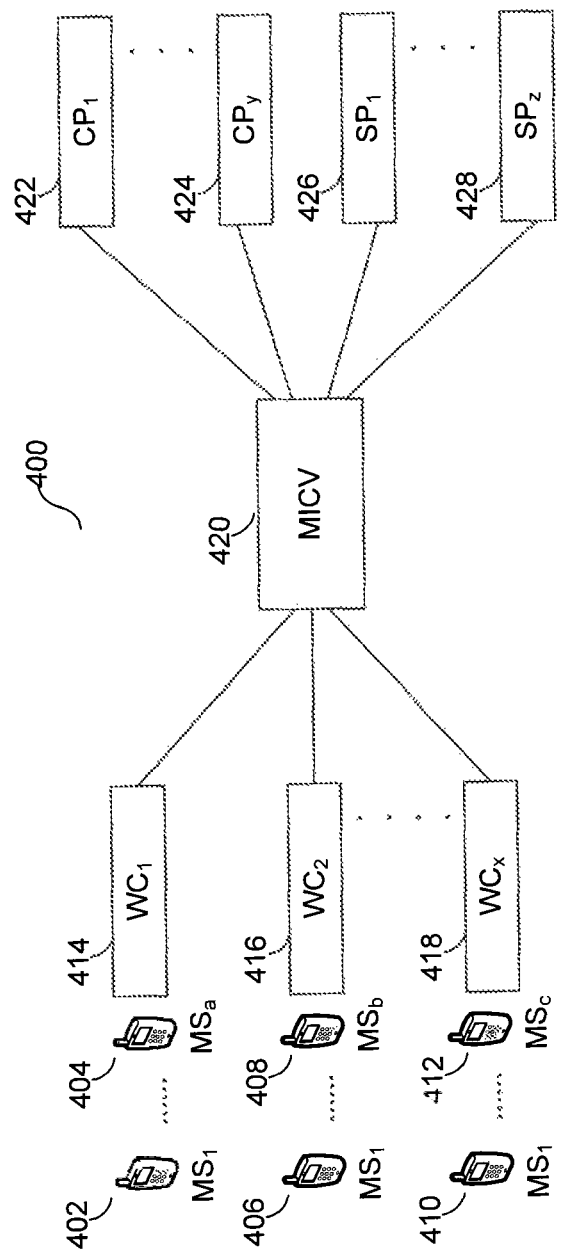
FIG. 4 is a diagrammatic presentation of an exemplary Messaging Inter-Carrier Vendor (MICV).

Consider for a moment the exemplary MICV 420 that is depicted (albeit only partially, at a high-level, and from a logical perspective) in FIG. 4 and reference numeral 400. The illustrated MICV 420 is disposed between, possibly inter alia, multiple WCs (WC$_1$ 414, WC$_2$ 416, WC$_x$ 418) on one side and multiple CPs (CP$_1$ 422 ... CP$_y$ 424) and SPs (SP$_1$ 426 ... SP$_z$ 428) on the other side and is, in effect, a horizontally and vertically scalable 'hub' that may among other things 'bridge' all of the connected entities and inter alia facilitate the ubiquitous exchange of traffic (including, inter alia, data, SMS messages, MMS messages, IMS messages, USSD-based data, etc.) between various of the connected participants. A MICV 420 thus, as one simple example, may offer various routing, formatting, delivery, value-add, etc. capabilities that provide, possibly inter alia:

1) A WC WC$_1$ 414 ... WC$_x$ 418 (and, by extension, all of the MSs (MS$_1$ 402 ... MS$_a$ 404, MS$_1$ 406 ... MS$_b$ 408, MS$_1$ 410 ... MS$_c$ 412) that are serviced by WC$_1$ 414 ... WC$_x$ 418) with ubiquitous access to a broad universe of CPs (such as CP$_1$ 422 ... CP$_y$ 424) and SPs (such as SP$_1$ 426 ... SP$_z$ 428), and 2) A CP (such as CP$_1$ 422 ... CP$_y$ 424) or a SP (such as SP$_1$ 426 ... SP$_z$ 428) with ubiquitous access to a broad universe of WCs WC$_1$ 414 ... WC$_x$ 418 (and, by extension, to all of the MSs (MS$_1$ 402 ... MS$_a$ 404, MS$_1$ 406 ... MS$_b$ 408, MS$_1$ 410 ... MS$_c$ 412) that are serviced by WC$_1$ 414 ... WC$_x$ 418).

Generally speaking a MICV may have varying degrees of visibility (e.g., access, etc.) to the (MS-MS, MS-CP, MS-SP, etc.) messaging traffic. For example:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that numerous other arrangements are equally applicable and indeed are fully within the scope of the present invention.

As just one example of an alternative arrangement, aspects of the present invention may be offered by a SP. A SP may, for example, be realized through any combination of, possibly inter alia, any one or more of (1) an element of a WC, an element of a landline carrier, an element of a MICV, or multiple such elements working together; (2) a 3P such as possibly inter alia a merchant, a CP, a financial institution, etc.; (3) multiple 3P entities working together; (4) a service bureau; (5) a message service provider; and/or (6) other entities.

Figure 5:
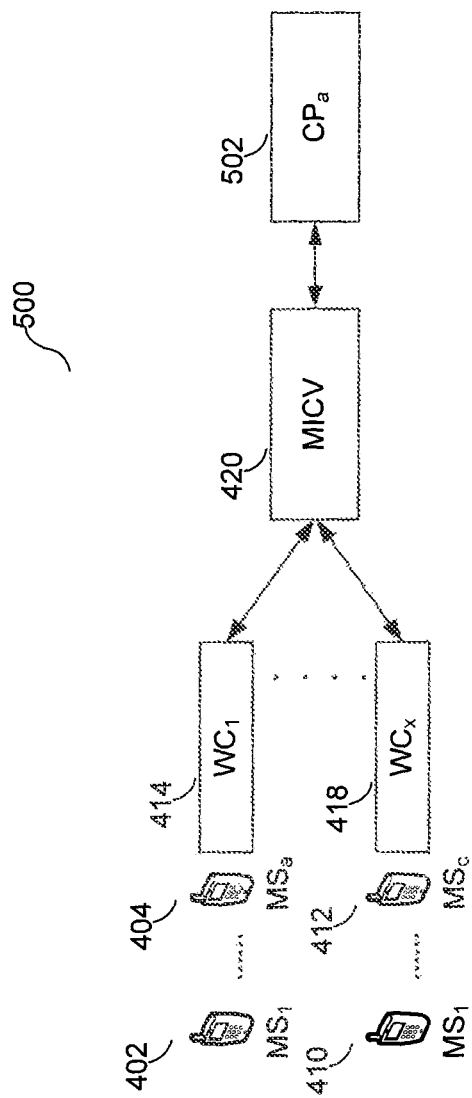
FIG. 5 illustrates one particular arrangement that is possible through aspects of the present invention.

FIG. 5 and reference numeral 500 depict one particular approach that may be possible under such an alternative arrangement. As the diagram portrays, the messaging traffic of numerous MSs (MS$_1$ 402 ... MS$_a$ 404 and MS$_1$ 410 ... MS$_c$ 412) that are serviced by WC$_1$ 414 ... WC$_x$ 418 is exchanged with a MICV 420 (a MICV that offers, possibly inter alia, aspects of the present invention) and the MICV 420 is connected with CP$_a$ 502 (a CP that utilizes, possibly inter alia, aspects of the present invention).

While the paragraph above referred to one specific alternative arrangement, it will be readily apparent to one of ordinary skill in the relevant art that numerous other alternative arrangements (including inter alia the use of multiple CPs; the sharing, blending, etc. of functionality between a MICV and one or more CPs; etc.) are equally applicable and indeed are fully within the scope of the present invention.

For variety, completeness etc. of exposition, portions of the discussion below will include a MICV and a CP. As noted above, it will be readily apparent to one of ordinary skill in the relevant art that numerous other arrangements are easily possible (e.g., any combination of one or more of inter alia a single MICV, multiple MICVs, a single CP, multiple CPs, etc.).

In the discussion below reference is made to 'messages' that may be sent, for example, between a MS and a CP. As set forth below, a given 'message' (e.g., an SMS message, a MMS message, an IMS message, a quanta of data, USSD-based data, etc.) sent between a MS and a CP may actually comprise a series of steps in which the message is received, forwarded and routed between different entities, including possibly inter alia a MS, a WC, a MICV, and a CP. Thus, unless otherwise indicated, it will be understood that reference to a particular message generally includes that particular message as conveyed at any stage between an origination source, such as for example a MS, and an end receiver, such as for example a CP. As such, reference to a particular message generally includes a series of related communications between, for example, a MS and a WC; a WC and a MICV; a MICV and a CP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

Figure 6:
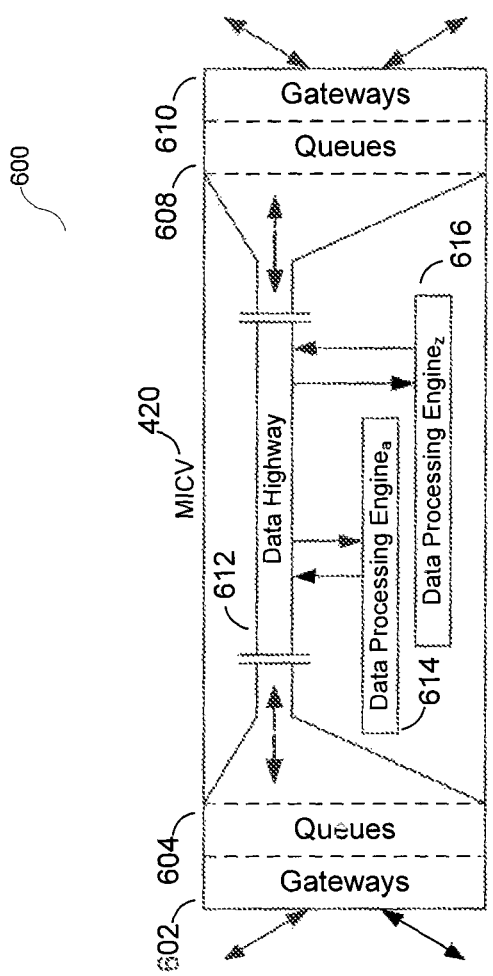
FIG. 6 illustrates various implementation aspects of an exemplary MICV.

For purposes of illustration, FIG. 6 and reference numeral 600 depict a possible logical implementation of aspects of a MICV 420 under one particular embodiment. The figure depicts among other things Gateways (602 and 610 that for example provide information/data receipt and dispatch capabilities, to/from different external entities such as inter alia WCs and CPs, across possibly inter alia different application-level communication protocols), Queues (604 and 608 that for example provide interim storage and buffering capabilities), a Data Highway (DH 612, that for example provides interconnection capabilities), and DPEs 614-616.

A MICV 420 may contain any number of other elements beyond those which are explicitly depicted in FIG. 6. For example, a MICV 420 may contain a comprehensive administrative facility through which all of the different elements of a MICV may be inter alia configured, controlled, managed, etc. As another example, a MICV 420 may contain one or more repositories to support, contain the results of, etc. among other things configuration, processing, monitoring, logging, reporting, etc. information. Such repositories may be implemented through any combination of one or more of inter alia a conventional Relational Database Management Systems (RDBMS), an Object Database Management Systems (ODBMS), an in-memory Database Management Systems (DBMS), or any other equivalent facilities. Among other things, such repositories may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

3) Different (e.g., real-time) decision making capabilities through among other things any combination of one or more of analytics facilities; data warehouses; (scheduled, batch, event-driven, real-time, etc.) Extraction-Transformation-Load (ETL) operations; etc. with the results of same presented through reporting, GISs, visualization, etc. facilities and delivered through SMS, MMS, etc. messages; through E-Mail; through a WWW-based facility; etc.

Figure 7:
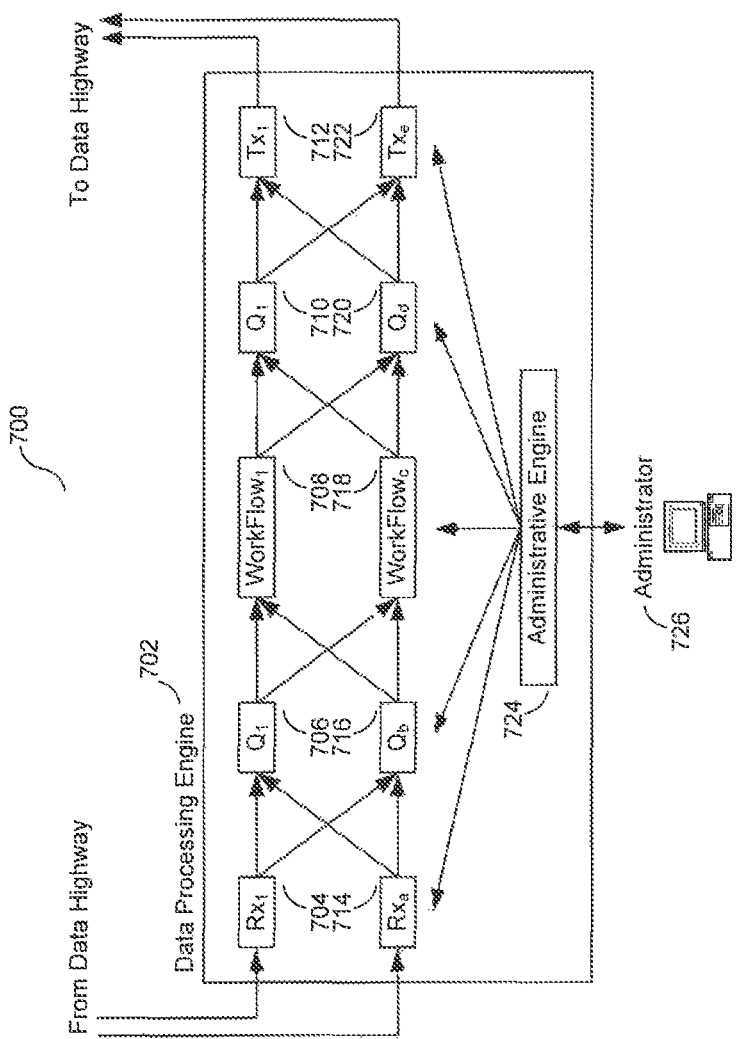
FIG. 7 illustrates various implementation aspects of an exemplary MICV Data Processing Engine (DPE).

FIG. 7 and reference numeral 700 depict a possible logical implementation of aspects of a DPE 702. A DPE 702 may contain among other things several key components—Receivers ($Rx_1$ 704 . . . $Rx_a$ 714 in the diagram), Queues ($Q_1$ 706 . . . $Q_b$ 716 and $Q_1$ 710 . . . $Q_d$ 720 in the diagram), WorkFlows (WorkFlow$_1$ 708 . . . WorkFlow$_c$ 718 in the diagram), Transmitters ($Tx_1$ 712 . . . $Tx_c$ 722 in the diagram), and an Administrator 726. It will be readily apparent to one of ordinary skill in the relevant art that numerous other components, and/or component arrangements, are possible within a DPE 702.

A dynamically updateable set of one or more Receivers ($Rx_1$ 704 . . . $Rx_a$ 714 in the diagram) 'get' data from a MICV DH (e.g., reference numeral 612 in FIG. 6) and deposit same on an intermediate or temporary Queue ($Q_1$ 706 . . . $Q_b$ 716 in the diagram) for subsequent processing.

A dynamically updateable set of one or more Queues ($Q_1$ 706 . . . $Q_b$ 716 and $Q_1$ 710 . . . $Q_d$ 720 in the diagram) operate as intermediate or temporary buffers for incoming and outgoing data.

A dynamically updateable set of one or more WorkFlows (WorkFlow$_1$ 708 . . . WorkFlow$_c$ 718 in the diagram) remove incoming data from an intermediate or temporary Queue ($Q_1$ 706 . . . $Q_b$ 716 in the diagram), perform all of the required operations on the data, and deposit the processed data, results, etc. on an intermediate or temporary Queue ($Q_1$ 710 . . . $Q_d$ 720 in the diagram). The WorkFlow component may among other things implement various of the MICV processing activities (such as for example aspects of different façade services) that are described below.

A dynamically updateable set of one or more Transmitters ($Tx_1$ 712 . . . $Tx_c$ 722 in the diagram) remove processed data, results, etc. from an intermediate or temporary Queue ($Q_1$ 710 . . . $Q_d$ 720 in the diagram) and 'put' the same on a MICV DH (e.g., reference numeral 612 in FIG. 6).

An Administrative Engine 724 provides a linkage to all of the different components of a DPE 702 so that a DPE 702, along with all of the different components of a DPE 702, may be fully and completely administered or managed through, as just one example, a WWW-based interface. It will be readily apparent to one of ordinary skill in the relevant art that numerous other interfaces (e.g., a data feed, an Application Programming Interface (API), etc.) are easily possible.

For simplicity of exposition, the discussion below will refer to SMS messages. As noted above, it will be readily apparent to one of ordinary skill in the relevant art that numerous other communication paradigms (including inter alia USSD-based exchanges, MMS messaging, IMS messaging, an exchange of a quanta of data, etc.) are easily possible.

Among other things a portion of a MICV, operating inter alia a message service gateway, may expose a façade which inter alia may hide various of the complexities, technical aspects, etc. of SMS messaging and through which a CP, possibly among others, may initiate, pursue, complete, etc. among other things various opt-in and opt-out activities in connection with different of the campaigns, initiatives, etc. that are offered by the CP. Such a façade may inter alia:

1) Provide a simple mechanism for communication with, possibly among others, a CP. Such a mechanism may for example be Simple Object Access Protocol (SOAP)-based and may leverage among other things popular and commonly-available technologies such as HyperText Transfer Protocol (HTTP) and Extensible Markup Language (XML). Other communication models (beyond HTTP, such as for example Simple Mail Transfer Protocol (SMTP), etc.) and other structural models (beyond XML, such as for example simple text, raw data, etc.) are also possible. Additionally, such a mechanism may leverage an API.

2) Offer a simple set of high-level services that support possibly among other things opt-in and opt-out activities. An exemplary set of such services might include among other things:

A) optIn ([recipient], [application]). Initiate an opt-in process for [recipient] (e.g., the Telephone Number (TN) of a WD of a MS such as "7035551234") for [application] (e.g., the identifier of a CP campaign, initiative, etc. such as "PROMO1").

B) getOptInList ([application]). Return a list of all of the recipients (e.g., the TNs of MS WDs) that have opted-in to [application] (e.g., the identifier of a CP campaign, initiative, etc. such as "PROMO1").

C) optOut ([recipient], [application]). Initiate an opt-out process for [recipient] (e.g., the TN of a WD of a MS such as "7035551234") for [application] (e.g., the identifier of a CP campaign, initiative, etc. such as "PROMO1").

D) getOptOutList ([application]). Return a list of all of the recipients (e.g., TNs of MS WDs) that have opted-out from [application] (e.g., the identifier of a CP campaign, initiative, etc. such as "PROMO1").

It will be readily apparent to one of ordinary skill in the relevant art that numerous other services, beyond those that were listed above, are easily possible. As well, one of ordinary skill in the relevant art will recognize that different service naming nomenclatures, argument or parameter lists, argument or parameter names, etc. are also easily possible.

Various of the offered services may optionally return one or more codes, indicators, values, etc. conveying inter alia result information (such as for example success, failure, status, etc.); state; a sequence identifier; a transaction identifier; a tracking code; a Globally Unique Identifier (GUID) or similar artifact; etc.

The offered services may be invoked (by for example a CP) through any number of means, programming languages, channels, etc. including inter alia Java (and any of the Java-oriented extensions, middleware facilities, etc. such as for example Java Message Service (JMS)), JavaScript, Python, Perl, C, C++, etc.

3) Hide the complicated, proprietary, etc. communication protocols (such as for example Short Message Peer-to-Peer (SMPP), External Machine Interface (EMI)/Universal Computer Protocol (UCP), Computer Interface to Message Distribution (CIMD), Signaling System No. 7 (SS7), etc.) that are commonly used to exchange messages with (e.g., a Short Message Service Center (SMSC) of) a WC.

4) Hide the complicated, proprietary, etc. message specifics (such as for example SMPP Protocol Data Unit (PDU) structure and content, data element encodings, sliding windows, queuing, etc.) that arise with #3 above.

Through the high-level services that are offered by the façade a CP, possibly among others, may quickly and easily craft general solutions that among other things are not tied to any particular WC, avoid the complexities that arise with WC-oriented communication protocols, exploit popular and commonly-available technologies with which a CP will likely have familiarity, etc.

Through a façade as described above a CP may for example and inter alia simply and easily:

1) Initiate an opt-in process for a MS for a campaign, initiative, etc. of the CP to among other things confirm, ensure, etc. that the MS does indeed wish to participate in the campaign, initiative, etc and among other things receive, and possibly pay for, any SMS messages that may be associated with same.

2) Initiate an opt-out process—for a campaign, initiative, etc. to which a MS has previously opted-in—to among other things confirm, ensure, etc. that the MS does indeed wish to end their participation in the campaign, initiative, etc.

3) Respond to a MS-initiated opt-in request. For example, a MS may have become aware of a campaign, initiative, etc. of a CP—by observing a magazine, newspaper, billboard, television, etc. advertisement; by visiting a WWW site (of the CP or of another party); by receiving a piece of postal mail; etc.—and then initiated an opt-in process.

4) Respond to a MS-initiated opt-out request. For example, a MS may wish to end their participation in a campaign, initiative, etc. of a CP, to which they had previously opted-in, and the MS initiated an opt-out process.

Figure 8:
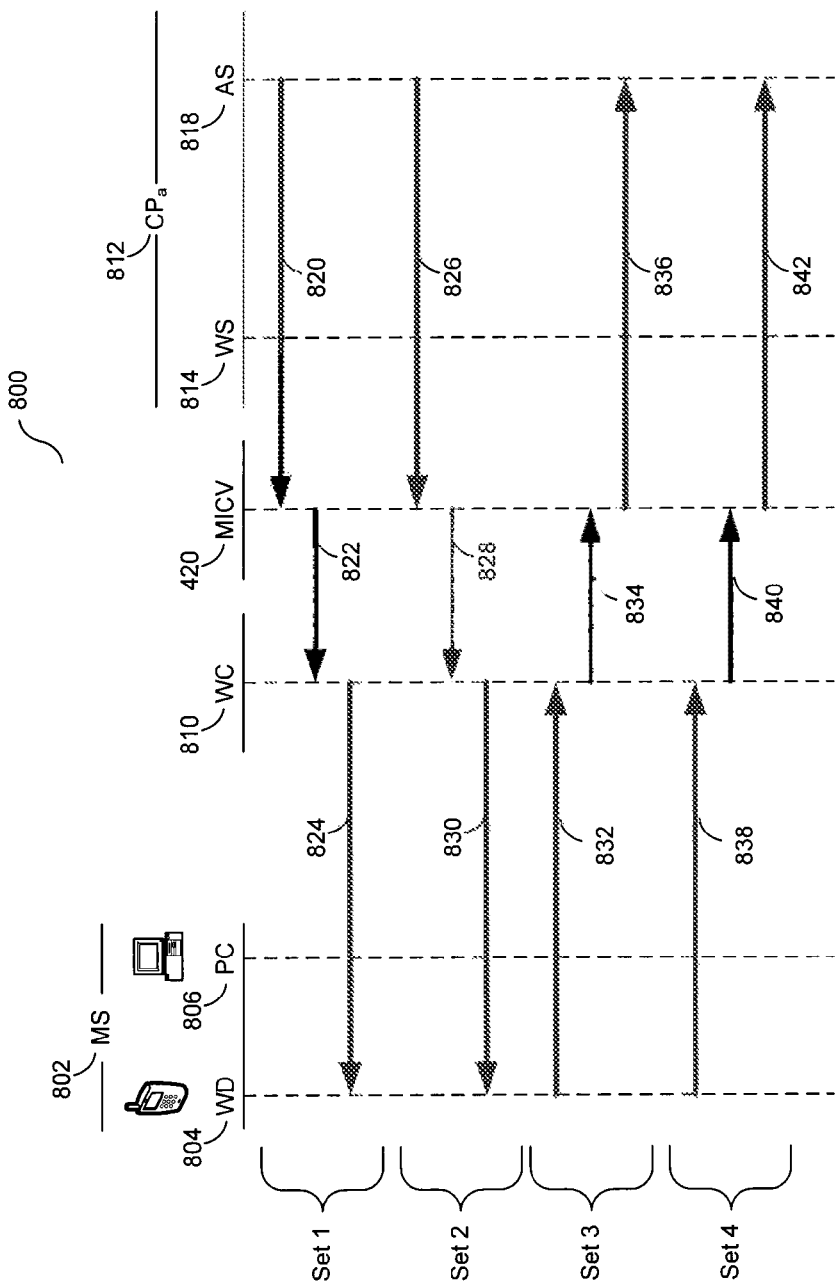
FIG. 8 illustrates various of the exchanges or interactions that are possible under a portion of the present invention.

FIG. 8 and reference numeral 800 depict, at a high level, an exemplary arrangement under which aspects of a façade that was described above may be explored. Of interest and note in FIG. 8 are:

MS 802. Mary, a hypothetical MS.

MS 802 WD 804. For example, Mary's WD such as mobile telephone, smart phone, BlackBerry, PalmPilot, iPhone, etc.

MS 802 Personal Computer (PC) 806. For example, one of Mary's 302 home, work, etc. desktop, laptop, portable, pad, etc. computers.

WC 810. The provider of service for Mary's 802 WD 804.

MICV 420. A MICV that possibly among other things offers aspects of the present invention. As noted above, the use of a MICV, although not required, provides significant advantages.

$CP_a$ 812. A CP that possibly among other things employs aspects of the present invention.

$CP_a$ 812 Web Server (WS) 814. A publicly-available WWW site that is provided by $CP_a$ 812.

$CP_a$ 812 Application Server (AS) 818. One or more platforms (e.g., collections of hardware, software, etc.) that inter alia support interactions, communications, etc. with different components internal to $CP_a$ 812 (such as for example WS 814, etc.) and/or entities external to $CP_a$ 812 (such as for example MICV 420, etc.).

It is important to note that while in FIG. 8 the MS 802 WD 804 and MS 802 PC 806 entities are illustrated as being adjacent or otherwise near each other, in actual practice the entities may, for example, be physically located anywhere.

In FIG. 8 the exchanges that are collected under the designation Set 1 represent various of the activities that might take place as $CP_a$ 812 initiates an opt-in process for Mary 802, and a WD 804 belonging to Mary 802, for a campaign, initiative, etc. that is offered by $CP_a$ 812. Possibly inter alia:

1) $CP_a$ 812 AS 818 may invoke an optIn( ) service (see 820) as exposed through a façade that is provided by MICV 420. The service invocation may include inter alia two arguments or parameters—[recipient] containing the TN (e.g., "7035551234") of a WD 804 belonging to Mary 802 and [application] containing the identifier (e.g., "PROMO1") of a specific CP campaign, initiative, etc.

2) MICV 420 may complete a range of processing activities resulting in possibly among other things a Mobile Terminated (MT) SMS message (see 822 . . . 824) being sent to WD 804.

3) MICV 420 may employ inter alia a Short Code (SC) or a TN as the source address in SMS message 822 (and to which it would ask users of its service to direct any reply messages). While the abbreviated length of a SC (e.g., five digits for a SC administered by Neustar under the Common Short Code (CSC) program) incrementally enhances the experience of a MS 802 (e.g., the MS 802 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. Pat. No. 8,019,362 titled "UNIVERSAL SHORT CODE ADMINISTRATION FACILITY" and its associated continuations.

4) MICV 420 may map, associate, etc. the value of an [application] argument or parameter (such as for example "PROMO1") to a specific address such as a SC (such as for example "654321").

The specific exchanges that were described above (as residing under the designation Set 1) are illustrative only and it will be readily apparent to one of ordinary skill in the relevant art that numerous other exchanges are easily possible and indeed are fully within the scope of the present invention. For example:

1) Mary 802 may optionally reply to a received opt-in request message (see 824) resulting in possibly among other things the generation, processing, etc. of one or more additional exchanges, SMS messages, etc. During any such activity Mary 802 may need to reply within a specified amount of time for the reply to be considered valid.

2) Aspects of the sequence 820-824 may be repeated any number of times.

3) $CP_a$ 812 may dispatch to Mary 802 one or more opt-in confirmation messages. Such messages may be in the form of any combination of one or more of for example SMS, E-Mail, IM, etc.

4) Aspects of an opt-in process may be completed through any combination of one or more other (i.e., non-SMS) channels. For example, $CP_a$ 812 may employ a PC 806 of Mary 802 through inter alia an exchange of E-mail messages, visiting a WWW site (of $CP_a$ 812, that is WS 814, or of another entity), etc. Other channels such as telephone, Interactive Voice Response (IVR) system, postal mail, etc. may also be employed.

Figure 9:
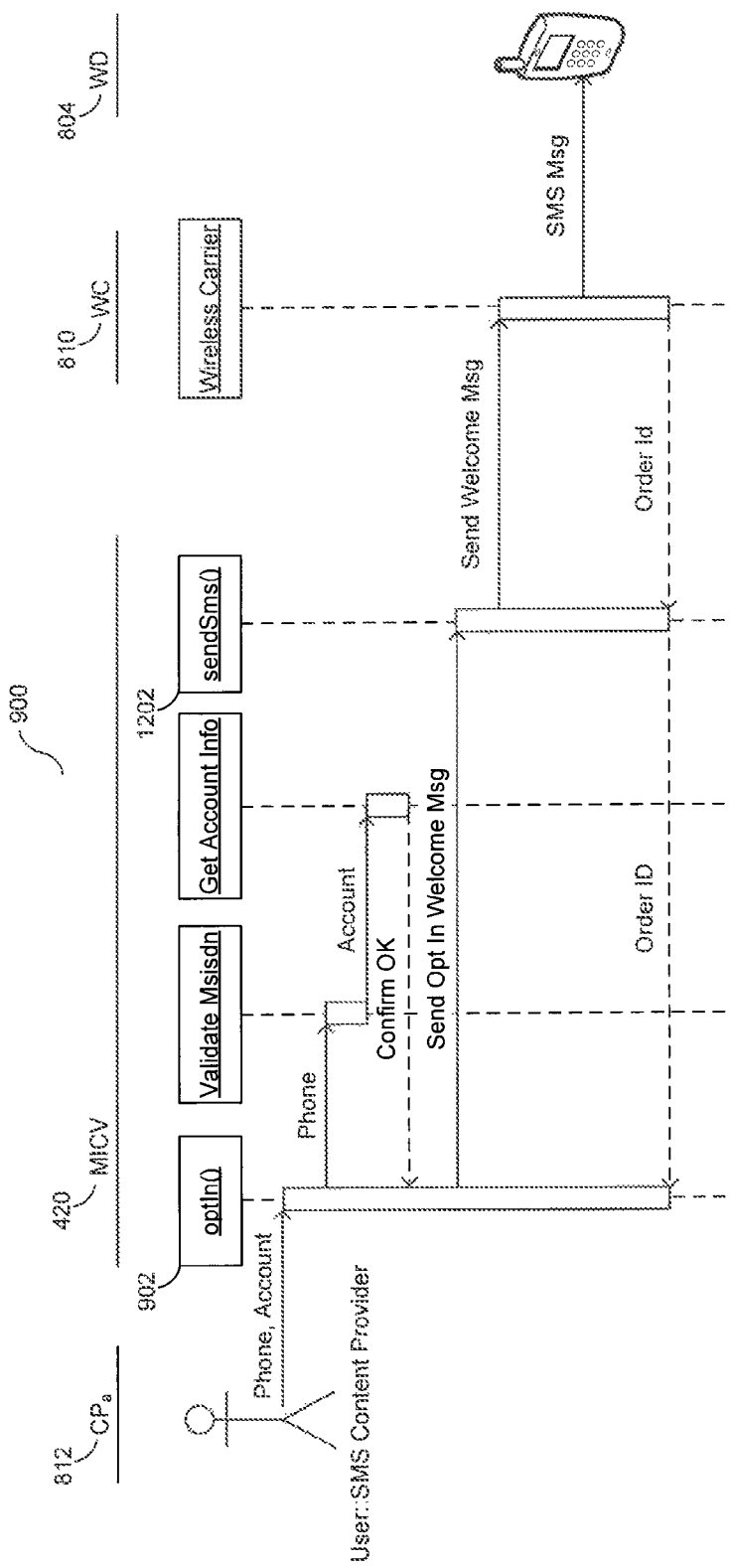
FIGS. 9-11 depict in somewhat more detail various of the exchanges that are illustrated in FIG. 8.

FIG. 9 and reference numeral 900 illustrate one particular way in which aspects of the Set 1 exchanges that were described above might be implemented. For convenience, FIG. 9 borrows several identifiers from FIG. 8 ($CP_a$ 812, MICV 420, WC 810, and WD 804). As depicted in FIG. 9, among other things a CP may invoke an optIn( ) service 902 as offered by a façade that is exposed by MICV 420. FIG. 9 references a sendSMS( ) service 1202 which will be described below in connection with FIG. 12.

In FIG. 8 the exchanges that are collected under the designation Set 2 represent various of the activities that might take place as $CP_a$ 812 initiates an opt-out process for Mary 802. Possibly inter alia:

1) $CP_a$ 812 AS 818 may invoke an optOut( ) service (see 826) as exposed through a façade that is provided by MICV 420. The service invocation may include inter alia two arguments or parameters—[recipient] containing the TN (e.g., "7035551234") of a WD 804 belonging to Mary 802 and [application] containing the identifier (e.g., "PROMO1") of a specific CP campaign, initiative, etc.

2) MICV 420 may complete a range of processing activities resulting in possibly among other things a MT SMS message (see 828 . . . 830) being sent to WD 804.

3) MICV 420 may employ inter alia a SC or a TN as the source address of SMS message 828 (and to which it would ask users of its service to direct any reply messages).

4) MICV 420 may map, associate, etc. the value of an [application] argument or parameter (such as for example "PROMO1") to a specific address such as a SC (such as for example "654321").

The specific exchanges that were described above (as residing under the designation Set 2) are illustrative only and it will be readily apparent to one of ordinary skill in the relevant art that numerous other exchanges are easily possible and indeed are fully within the scope of the present invention. For example:

1) Mary 802 may optionally reply to a received opt-out request message (see 830) resulting in possibly among other things the generation, exchange, etc. of one or more additional exchanges, SMS messages, etc. During any such activity Mary 802 may need to reply within a specified amount of time for the reply to be considered valid.

2) Aspects of the sequence 826-830 may be repeated any number of times.

3) $CP_a$ 812 may dispatch to Mary 802 one or more opt-out confirmation messages. Such messages may be in the form of any combination of one or more of for example SMS, E-Mail, IM, etc.

4) Aspects of an opt-out process may be completed through any combination of one or more other (i.e., non-SMS) channels. For example, $CP_a$ 812 may employ a PC 806 of Mary 802 through inter alia an exchange of E-mail messages, visiting a WWW site (of $CP_a$ 812, for example WS 814, or of another entity), etc. Other channels such as telephone, IVR, postal mail, etc. may also be employed.

Figure 10:
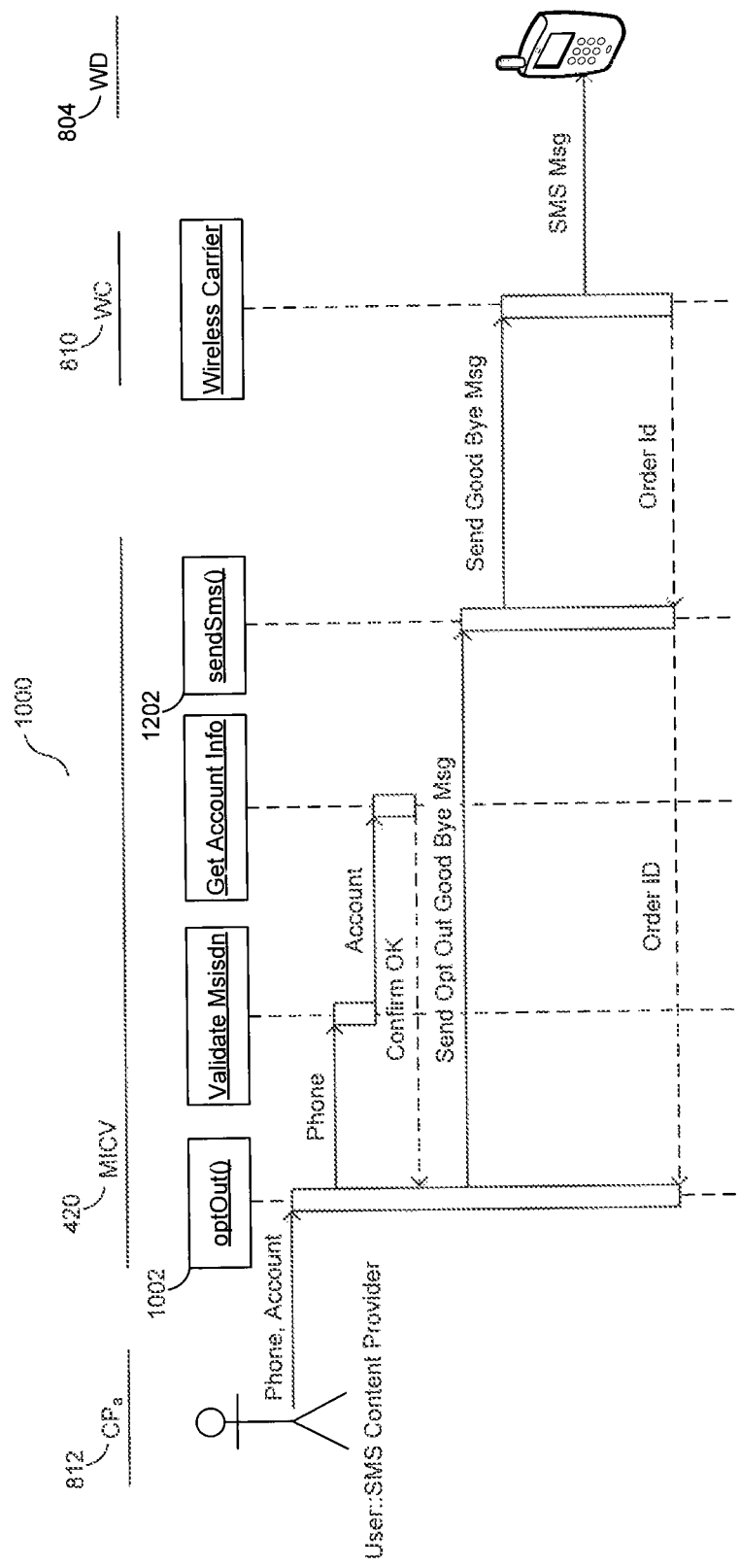

FIG. 10 and reference numeral 1000 illustrate one particular way in which aspects of the Set 2 exchanges that were described above might be implemented. For convenience, FIG. 10 borrows several identifiers from FIG. 8 ($CP_a$ 812, MICV 420, WC 810, and WD 804). As depicted in FIG. 10, among other things a CP may invoke an optOut( ) service 1002 as offered by a façade that is exposed by MICV 420. FIG. 10 references a sendSMS( ) service 1202 which will be described below in connection with FIG. 12.

In FIG. 8 the exchanges that are collected under the designation Set 3 represent various of the activities that might take place as Mary 802 employs her WD 804 to initiate an opt-in process for a campaign, initiative, etc. that is offered by $CP_a$ 812. Possibly inter alia:

1) Mary 802 may dispatch, from her WD 804, a Mobile Originated (MO) opt-in request SMS message (see 832) towards $CP_a$ 812.

2) In the instant example the message is shown traversing a MICV 420 (see 834-836). As described previously, numerous alternatives are easily possible.

3) Mary 802 may address her opt-in request SMS message (see 832) to for example a SC, a TN, etc.

4) MICV 420 may map, associate, etc. the destination address (e.g., SC "654321") of Mary's opt-in request SMS message to arrive at an identifier (e.g., "PROMO1") of a specific CF campaign, initiative, etc. Additionally, a MICV 420 may recover the source address (e.g., TN "7035551234") from Mary's opt-in request SMS message. Armed with these two, and possibly other, values a MICV 420 may among other things invoke an optIn( ) service (as offered by a façade that is exposed by MICV 420) with the service invocation including inter alia two arguments or parameters—[recipient] containing the TN "7035551234" and [application] containing the identifier "PROMO1."

The specific exchanges that were described above (as residing under the designation Set 3) are illustrative only and it will be readily apparent to one of ordinary skill in the relevant art that numerous other exchanges are easily possible and indeed are fully within the scope of the present invention. For example:

1) A MS-initiated opt-in request message (see 832) may result in possibly among other things the generation, processing, etc. of one or more additional exchanges, SMS messages, etc. For example, $CP_a$ 812 may dispatch an inquiry, confirmation, etc. message (e.g., "Are you sure?") to one or more of Mary's 802 WD 804, PC 806, etc. to which among other things Mary 802 may need to reply (within a certain amount of time, etc.).

2) Aspects of the sequence 832-836 may be repeated any number of times.

3) $CP_a$ 812 may dispatch to Mary 802 one or more opt-in confirmation messages. Such messages may be in the form of any combination of one or more of for example SMS, E-Mail, IM, etc.

4) Aspects of an opt-in process may be completed through any combination of one or more other (i.e., non-SMS) channels. For example, $CP_a$ 812 may employ a PC 806 of Mary 802 through inter alia an exchange of E-mail messages, visiting a WWW site (of $CP_a$ 812, that is WS 814, or of another entity), etc. Other channels such as telephone, VR, postal mail, etc. may also be employed.

In FIG. 8 the exchanges that are collected under the designation Set 4 represent various of the activities that might take place as Mary 802 employs her WD 804 to initiate an opt-out process for a campaign, initiative, etc. that is offered by $CP_a$ 812. Possibly inter alia:

1) Mary 802 may dispatch, from her WD 804, a MO opt-out request SMS message (see 838) towards $CP_a$ 812.

2) In the instant example the message is shown traversing a MICV 420 (see 840-842). As described previously, numerous alternatives are easily possible.

3) Mary 802 may address her opt-out request SMS message (see 838) to for example a SC, a TN, etc.

4) MICV 420 may map, associate, etc. the destination address (e.g., SC "654321") of Mary's opt-out request SMS message to arrive at an identifier (e.g., "PROMO1") of a specific CP campaign, initiative, etc. Additionally, a MICV 420 may recover the source address (e.g., TN "7035551234") from Mary's opt-out request SMS message. Armed with these two, and possibly other, values a MICV 420 may among other things invoke an optOut( ) service (as offered by a façade that is exposed by MICV 420) with the service invocation including inter alia two arguments or parameters—[recipient] containing the TN "7035551234" and [application] containing the identifier "PROMO1."

The specific exchanges that were described above (as residing under the designation Set 4) are illustrative only and it will be readily apparent to one of ordinary skill in the relevant art that numerous other exchanges are easily possible and indeed are fully within the scope of the present invention. For example:

1) $CP_a$ 812 may optionally respond to a received opt-out request message (see 842) resulting in possibly among other things the generation, processing, etc. of one or more additional exchanges, SMS messages, etc. For example, $CP_a$ 812 may dispatch an inquiry, confirmation, etc. message (e.g., "Are you sure?") to one or more of Mary's 802 WD 804, PC 806, etc. to which among other things Mary 802 may need to reply (within a certain amount of time, etc.).

2) Aspects of the sequence 838-842 may be repeated any number of times.

3) $CP_a$ 812 may dispatch to Mary 802 one or more opt-out confirmation messages. Such messages may be in the form of any combination of one or more of for example SMS, E-Mail, IM, etc.

4) Aspects of an opt-out process may be completed through any combination of one or more other (i.e., non-SMS) channels. For example, $CP_a$ 812 may employ a PC 806 of Mary 802 through inter alia an exchange of E-mail messages, visiting a WWW site (of $CP_a$ 812, that is WS 814, or of another entity), etc. Other channels such as telephone, IVR, postal mail, etc. may also be employed.

Figure 11:
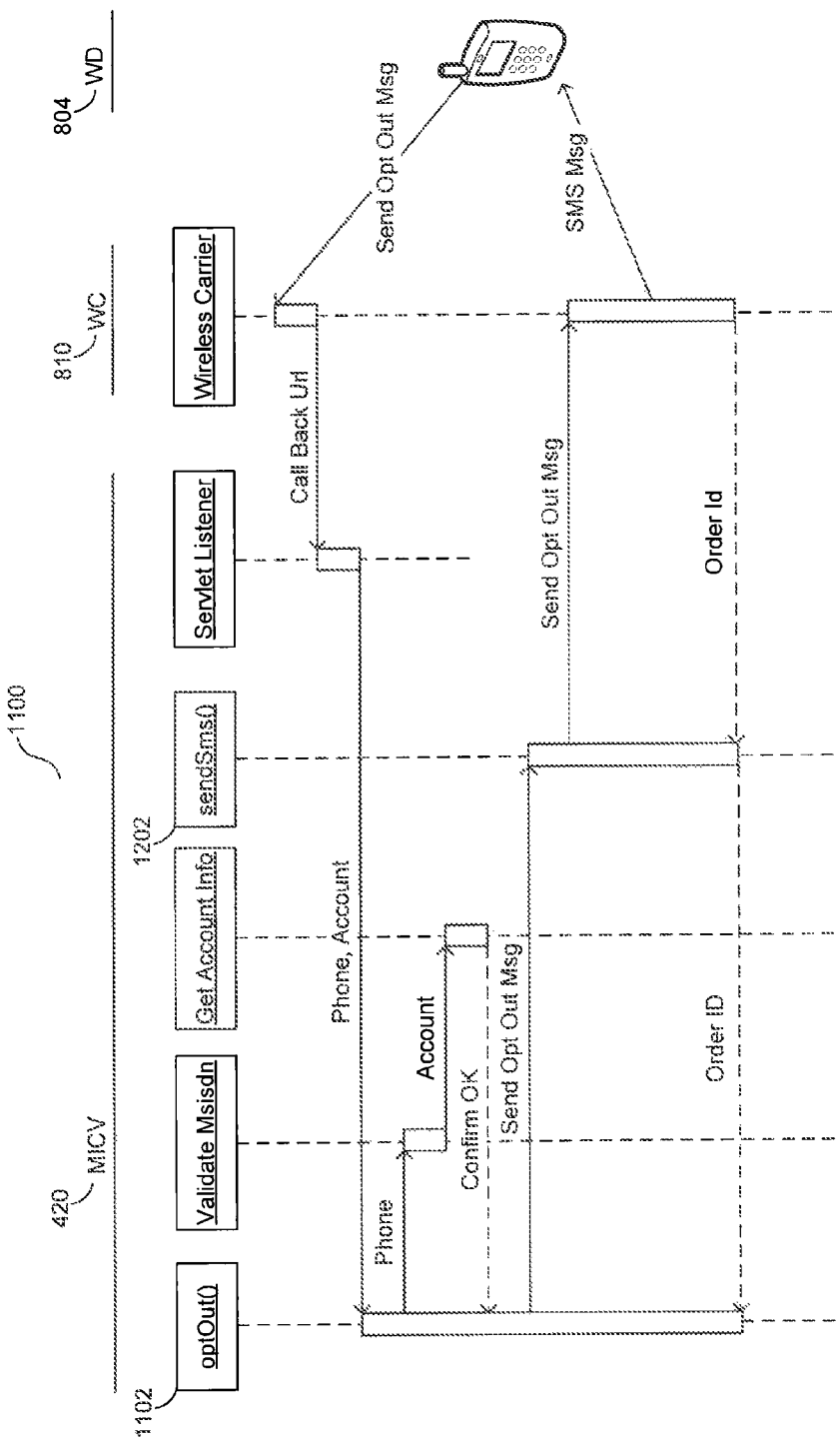

FIG. 11 and reference numeral 1100 illustrate one particular way in which aspects of the Set 4 exchanges that were described above might be implemented. For convenience, FIG. 11 borrows several identifiers from FIG. 8 (MICV 420, WC 810, and WD 804). As depicted in FIG. 11, among other things a MS initiates an opt-out process through a MO SMS message and, behind the scenes, an optOut( ) service 1102 (as offered by for example a façade that is exposed by MICV 420) may be invoked. FIG. 11 includes a sendSMS( ) service 1202 which will be described below in connection with FIG. 12.

The Set 1-Set 4 exchanges that were described above are illustrative only and it will be readily apparent to one of ordinary skill in the relevant art that numerous other exchanges are easily possible and indeed are fully within the scope of the present invention. For example and possibly inter alia:

1) MIVC 420 may offer support for among other things different opt-in models or paradigms (including inter alia single opt-in, double opt-in, etc.).

2) MICV 420 may support for example the maintenance, management, etc. of state (using possibly among other things a WD's TN, a date, a time, a sequence number, a session value, etc.) so that possibly among other things a MS and a CP can carry on a message-based conversation.

3) MICV 420 may require $CP_a$ 812 to present access credentials (such as for example a user ID, a password, etc.) in order to invoke a façade service. Such credentials may need to be presented each time that a service is invoked, may need to be (re)presented when demanded (e.g., randomly, at the end of some period of time, etc.), may only need to be presented the first time that a service is invoked, etc.

4) Exposed services (such as optIn( ), optOut( ) etc.) may be protected in different ways through various security, access, etc. mechanisms such as inter alia an Access Control List (ACL); black, grey, and/or white lists leveraging possibly among other things a (e.g., source) IP address; permissions; etc.

Figure 12:
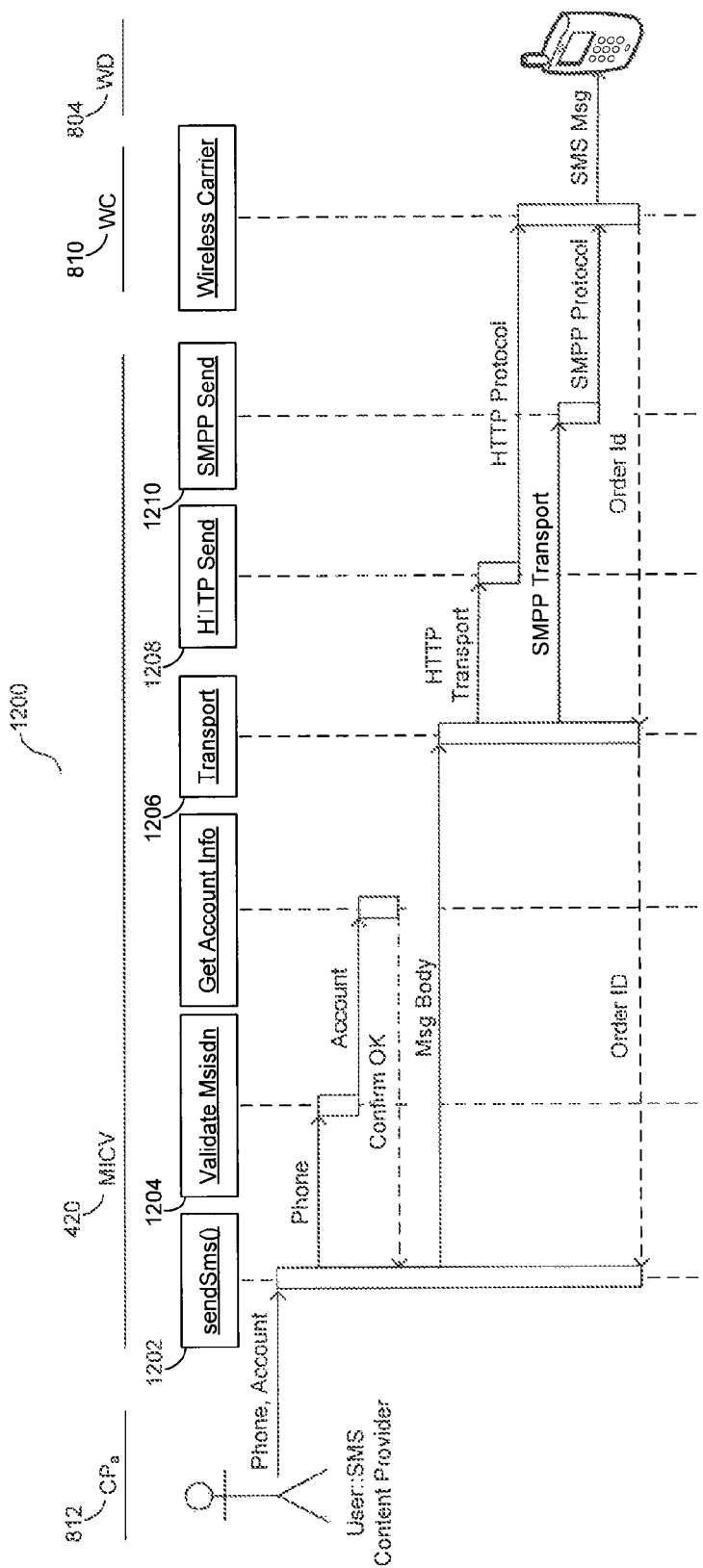
FIG. 12 depicts aspects of an illustrative sendSMS( ) service.

FIG. 12 and reference numeral 1200 depict various of the activities, steps, etc. that may be performed by a sendSMS( ) service 1202. For convenience, FIG. 12 borrows several identifiers from FIG. 8 ($CP_a$ 812, MICV 420, WC 810, and WD 804). A sendSMS( ) service 1202 may accept possibly among other things three arguments or parameters:

1) [recipient]. For example, the TN of a WD of a MS such as "7035551234."

2) [message]. For example, the body or content of an SMS message such as "Thank you for participating!"

3) [application]. For example, the identifier of a CP campaign, initiative, etc. such as "PROMO1."

and, as described above for the other services (optIn( ) optOut( ), etc.), may among other things return one or more codes, indicators, values, etc. Such a service may be exposed (externally) for use by inter alia a CP (through for example access credentials, permissions, ACLs, etc.) or be used (internally) just by a MICV.

Among other things a sendSMS( ) service 1202 may:

1) Complete various validation, edit, etc. operations against for example a [recipient] argument or parameter (e.g., the TN of a WD of a MS) (see for example 1204).

2) Map, associate, etc. an [application] argument or parameter to a particular address such as for example a SC.

3) Encode, replace, edit, etc. aspects of a [message] argument or parameter based on inter alia a destination WC, a selected message delivery channel, a destination MS' language requirements, etc.

A sendSMS( ) service 1202 may also complete an address resolution process against for example a [recipient] argument or parameter (e.g., the TN of a WD of a MS) to possibly among other things authoritatively determine the specific WC that services, etc. the WD that has the indicated TN (such as for example "7035551234"). Such an address resolution process may leverage an address resolution facility.

Figure 13:
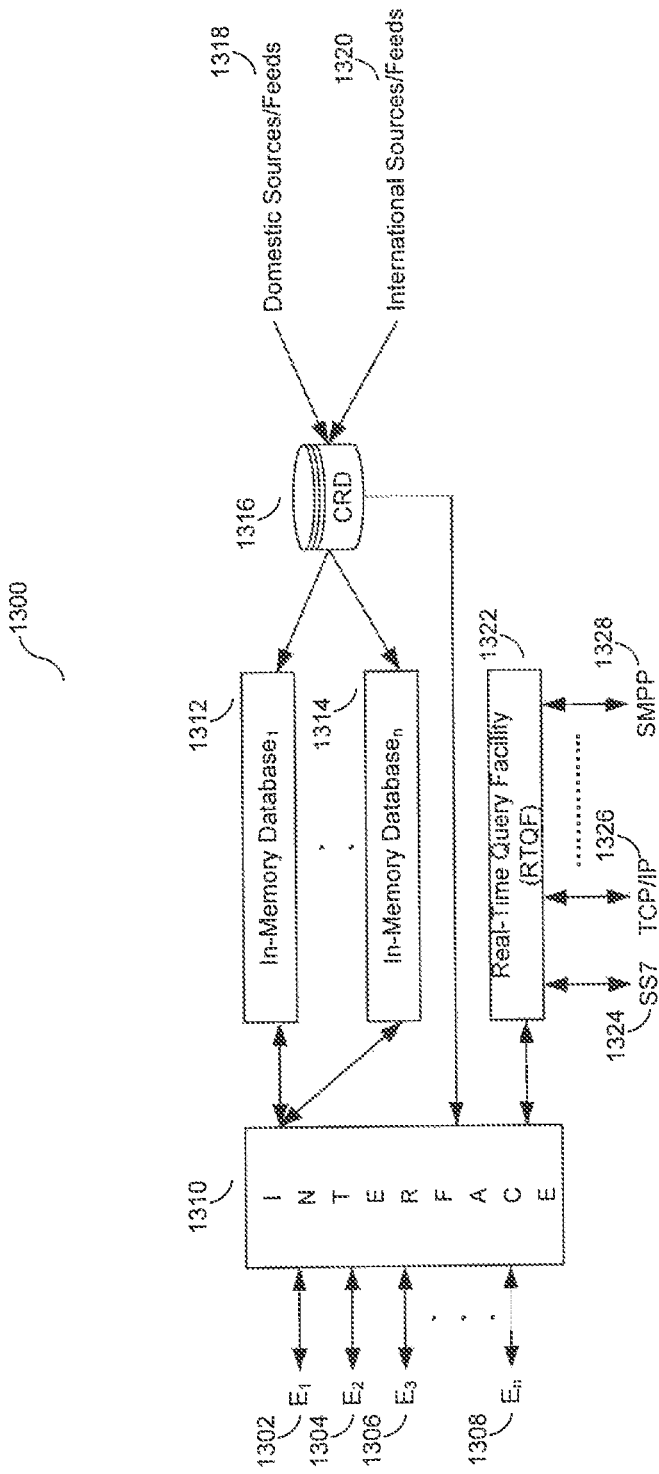
FIG. 13 illustrates aspects of an exemplary address resolution facility.

A depiction of an illustrative address resolution facility may be found in FIG. 13 and reference numeral 1300. Such a facility may consist of, possibly inter alia:

A) An Interface 1310 through which possibly inter alia various elements of a MICV ($E_1$ 1302, $E_2$ 1304, $E_3$ 1306, . . . $E_n$ 1308 in FIG. 13), including for example aspects of different façade services, may connect, submit routing inquiries, receive routing responses, etc.

B) A dynamically updateable set of one or more In-Memory Databases (In-Memory Database$_1$ 1312 . . . In-Memory Database$_n$ 1314 in the diagram) that optionally house or host selected data (including, possibly inter alia, data from a Composite Routing Database (CRD) 1316) to provide, as one example, optimal performance.

C) A Real-Time Query Facility (RTQF) 1322 through which inquiries may be dispatched real-time to authoritative bodies (such as, for example, TN assignment administrators) around the world. A RTQF 1322 may support multiple communication channels, paradigms, protocols, etc. (such as, possibly inter alia, SS7 1324, Transmission Control Protocol (TCP)/IP 1326, User Datagram Protocol (UDP)/IP, SMPP 1328, etc.).

D) A CRD 1316 containing comprehensive routing information for, possibly inter alia, TNs within all of the different TN numbering plans, schemes, etc. that exist around the world. A CRD 1316 may receive updates (e.g., dynamically, on a scheduled basis, etc.) from any number of sources or feeds including, possibly inter alia, domestic 1318 (such as, for example, from a Local Exchange Routing Guide (LERG), from one or more Number Portability Administration Centers (NPACs), etc.) and international 1320 (such as, for example, from Hong Kong, from the United Kingdom, etc.).

An address resolution facility as described above may support a wide range of address types including among others a TN (such as 7035551234, +1.703.555.1234, etc.), a SC (such as 46625), a Session Initiation Protocol (SIP) Uniform Resource Identifier (URI, such as sip:mark@mydomain.com), a Tel URI (such as tel:+19255552333), a Uniform Resource Locator (URL), etc.

Returning to FIG. 12, armed with knowledge of the specific WC that services, etc. the WD with the indicated TN, a SMS message delivery channel (such as for example and inter alia HTTP 1208, SMTP, SMPP 1210, etc.) may be selected 1206 based on among other things WC constraints, requirements, etc.; the current day, time, etc.; current system loadings such as for example queue depths, bandwidth consumption, etc. given for example different Quality of Service (QOS) requirements; a dynamically configurable set of rules, logic, etc.; etc.

Delivery channels may be dynamically added (to quickly provide support for additional protocols such as for example EMI/UCP, etc.), configured, managed, etc. Additionally, the various artifacts (such as for example routing rules, logic, configuration data, etc.) that a delivery channel leverages may be dynamically updated.

Figure 14:
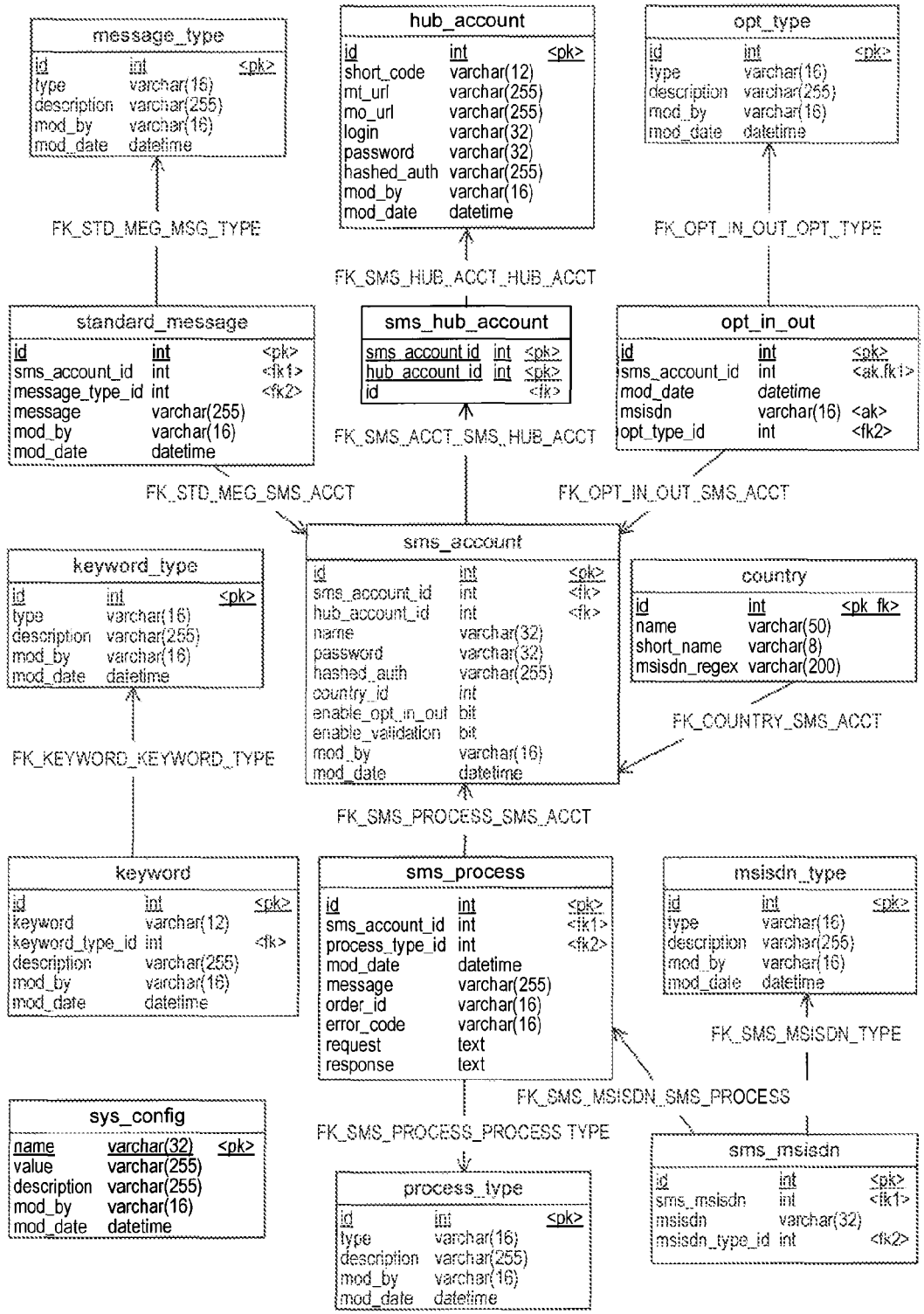
FIG. 14 illustrates aspects of an exemplary logical database model.

During various of the activities that were described above a range of data values, items, etc. may be generated. FIG. 14 depicts a portion of an exemplary logical database model through which aspects of such data values, items, etc. may optionally be preserved. The logical database model that is depicted in FIG. 14 may be implemented, realized, etc. through any combination of one or more of inter alia a conventional RDBMS, an ODBMS, an in-memory DBMS, or any other equivalent facilities. It will be readily apparent to one of ordinary skill in the relevant art that numerous other logical models, and logical model arrangements, are easily possible.

As just one example of the many extensions, additions, etc. that may be made to the disclosure that has been presented above, in connection with a MICV supporting, offering, etc. the capability, option, etc. of a message-based conversation, among other things:

1) The logical model that was described above in connection with FIG. 14 may be extended to explicitly capture, preserve, etc. for example the state of such a conversation.

2) Entries in the logical model that was described above in connection with FIG. 14 may be scanned, swept, etc. (on a scheduled basis, as a result of some trigger or event, etc.) to among other things derive, assess, etc. the state of such a conversation.

Figure 15:
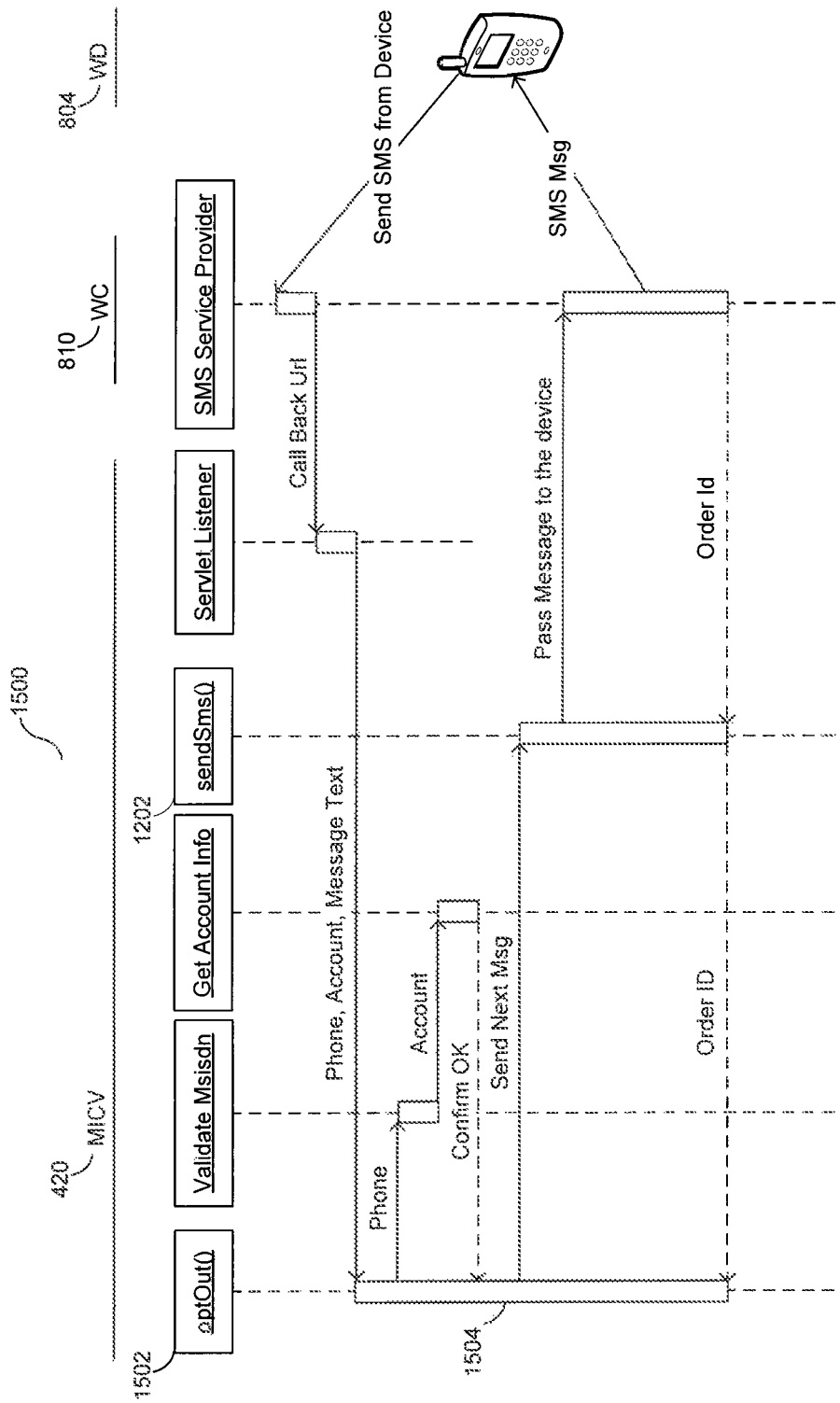
FIG. 15 depicts one possible service implementation.

3) FIG. 15 and reference numeral 1500 depict one particular way in which aspects of a message-based conversation might be supported in connection with a façade service (in the instant case an optOut( ) service 1502). FIG. 15 (a) borrows several identifiers from FIG. 8 (MICV 420, WC 810, and WD 804) and (b) includes a sendSMS( ) service 1202 which was described above in connection with FIG. 12. Reference numeral 1504 depicts a "Send Next Message" activity that might for example take place in connection with the sending of a second, third, fourth, etc. SMS MT message to a MS' WD 804, Activity 1504 may among other things leverage aspects of a logical data model (see for example the discussion above) to among other things preserve information regarding, assess the current, determine the next, etc. state of a message-based conversation.

It is important to note that a message-based conversation may have any number of topics, subjects, functions, etc. and consequently it will be readily apparent to one of ordinary skill in the relevant art that among other things many other façade services (beyond the optOut( ) service 1502 that is depicted in FIG. 15)—such as inter alia optIn( ) sendSMS( ) etc.—may support or offer a message-based conversation capability, option, etc.

Among other things a message-based conversation may leverage any combination of one or more supporting artifacts (such as for example a TN, a date, a time, a sequence number, a session value, a token, etc.) Additionally, a message-based conversation, as well as a supporting artifact, may be bounded by time so that among other things an expiration, ending, etc. point of same may be assigned. Within a message-based conversation the current, next, etc. state may be (algorithmically, mechanically, heuristically, etc.) derived, assessed, determined, etc. from any combination of one or more of a supporting artifact, a MS entry or response, rules, logic, etc.

During various of the activities that were described above one or more billing transactions may optionally be completed—e.g., for various of the processing steps that are performed, for each response returned, etc. A billing transaction may take any number of forms and may involve different external entities (e.g., a WC's billing system, a carrier billing system service bureau, a credit or debit card clearinghouse, etc.). A billing transaction may include, possibly inter alia:

1) The appearance of a line item charge on the bill or statement that, for example, an entity may receive from their WC. Exemplary mechanics and logistics associated with this approach are described in for example U.S. Pat. No. 7,640,211 entitled "SYSTEM AND METHOD FOR BILLING AUGMENTATION" and its associated continuations. Other ways of completing or performing line item billing are easily implemented by those skilled in the art.

2) The charging of a credit card or the debiting of a debit card.

3) The charging of an internal account.

4) The generation of aspects of an invoice. \

Various of the request, confirmation, etc. messages that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from for example a Location-Based Service (LBS) facility, a Global Positioning System (GPS), etc.).

Various of the request, confirmation, etc. messages that were described above may optionally contain advertising—e.g., textual material if a simple paradigm (such as SMS) is being utilized, or multimedia (images of brand logos, sound, video snippets, etc.) material if a more capable paradigm (such as MMS) is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from for example, a LBS facility, a GPS, etc.).

Various of the request, confirmation, etc. messages that were described above may optionally contain promotional materials (e.g., still images, video clips, etc.).

In the discussion that was presented above it will be readily apparent to one of ordinary skill in the relevant art that a reference to a TN encompasses any number of forms, structures, etc. including inter alia E.164-compliant values, country-specific values, values that are compliant with a specific numbering plan (such as for example the North American Numbering Plan (NANP)), etc.

The discussion that was presented above included SCs and TNs. However, it is to be understood that it would be readily apparent to one of ordinary skill in the relevant art that numerous other addresses or identifiers (such as possibly inter alia IP addresses, E-Mail addresses, IM handles, SIP addresses, etc.) are easily possible and indeed are fully within the scope of the present invention.

Aspects of the discussion that was presented above referenced messaging generally and SMS messaging specifically. However, as was noted previously, it will be readily apparent to one of ordinary skill in the relevant art that application of aspects of the present invention to numerous other communication paradigms (including inter alia other forms of messaging (such as for example MMS, IMS, etc.), USSD, a Voice over IP (VoIP) data stream, software application (e.g., game, etc.) data, a SIP-addressed artifact, a video data stream (e.g., a movie, a video conference call, etc.), a voice telephone call, an audio data stream (e.g., a song, etc.), signaling and other command-and-control data, etc.) are easily possible and indeed are fully within the scope of the present invention.

It is important to note that the hypothetical examples that were presented above, which were described in the narrative and which were illustrated in the accompanying figures, are exemplary only. They are not intended to be exhaustive or to limit the invention to the specific forms disclosed. It will be readily apparent to one of ordinary skill in the relevant art that numerous alternatives to the presented examples are easily possible and, indeed, are fully within the scope of the present invention.

The following list defines acronyms as used in this disclosure.

| Acronym | Meaning |
| --- | --- |
| A2P | Application-to-Peer |
| ACL | Access Control List |
| API | Application Programming Interface |
| AS | Application Server |
| BIOS | Basic Input/Output System |
| CD-ROM | Compact Disc Read-Only Memory |
| CIMD | Computer Interface to Message Distribution |
| CP | Content Provider |
| CRD | Composite Routing Database |
| CSC | Common Short Code |
| DBMS | Database Management System |
| DH | Data Highway |
| DPE | Data Processing Engine |
| DRAM | Dynamic Random Access Memory |
| E-Mail | Electronic Mail |
| EMI | External Machine Interface |
| EPROM | Erasable Programmable Read-Only Memory |
| ETL | Extraction-Transformation-Load |
| GIS | Geographic Information System |
| GPS | Global Positioning System |
| GUI | Graphical User Interface |
| GUID | Globally Unique Identifier |
| HTTP | HyperText Transfer Protocol |
| I/O | Input and/or Output |
| IM | Instant Messaging |
| IMS | IP Multimedia Subsystem |
| IP | Internet Protocol |
| IVR | Interactive Voice Response |
| JMS | Java Message Service |
| LAN | Local Area Network |
| LBS | Location-Based Service |
| LERG | Local Exchange Routing Guide |
| MEMS | Microelectromechanical Systems |
| MICV | Messaging Inter-Carrier Vendor |
| MMS | Multimedia Message Service |
| MO | Mobile Originated |
| MS | Mobile Subscriber |
| MT | Mobile Terminated |
| NANP | North American Numbering Plan |
| NPAC | Number Portability Administration Center |
| ODBMS | Object Database Management System |
| OS | Operating System |
| P2P | Peer-to-Peer |
| PC | Personal Computer |

-continued

| Acronym | Meaning |
| --- | --- |
| PCMCIA | Personal Computer Memory Card International Association |
| PDA | Personal Digital Assistant |
| PDU | Protocol Data Unit |
| PROM | Programmable Read-Only Memory |
| QoS | Quality of Service |
| RAM | Random Access Memory |
| RDBMS | Relational Database Management System |
| RF | Radio Frequency |
| RTQF | Real-Time Query Facility |
| SC | Short Code |
| SIP | Session Initiation Protocol |
| SMPP | Short Message Peer-to-Peer |
| SMS | Short Message Service |
| SMSC | Short Message Service Center |
| SMTP | Simple Mail Transfer Protocol |
| SOAP | Simple Object Access Protocol |
| SP | Service Provider |
| SS7 | Signaling System Seven |
| 3P | Third Party |
| TCP | Transmission Control Protocol |
| TN | Telephone Number |
| UCP | Universal Computer Protocol |
| UDP | User Datagram Protocol |
| URI | Uniform Resource Identifier |
| URL | Uniform Resource Locator |
| USSD | Unstructured Supplementary Service Data |
| VoIP | Voice Over IP |
| WAN | Wide Area Network |
| WAP | Wireless Application Protocol |
| WC | Wireless Carrier |
| WD | Wireless Device |
| WS | Web Server |
| WWW | World-Wide Web |
| XML | Extensible Markup Language |

What is claimed is:

1. In a message service gateway a server-based method for transiting a Short Message Service (SMS) message, the server-based method comprising:
providing, by a data processing engine of the message service gateway, a plurality of façade services, to a content provider, the content provider utilizing the plurality of façade services to initiate, through a data gateway of the message gateway, processes requested by a mobile subscriber;
receiving, by the data processing engine of the message service gateway, via the data gateway and utilizing a first protocol, a request to invoke one of the plurality of façade services; and
completing, by the data processing engine of the message service gateway, a plurality of processing operations comprising:
validating, by workflows of the data processing engine, service arguments of the invoked façade service,
examining, by the workflows of the data processing engine, the service arguments, and based on the examining,
utilizing an address resolution process that leverages an address resolution facility,
using the invoked façade service and the service arguments to submit to the address resolution facility routing inquiries, resulting in receipt of routing responses for a plurality of address types in order to determine a destination Wireless Carrier (WC),
transiting, by the workflows of the data processing engine, through another data gateway, at least part of the SMS message, utilizing a second protocol, towards the destination WC, wherein the second protocol is different than the first protocol.

2. The server-based method of claim 1, wherein the plurality of façade services are provided by a Messaging Inter-Carrier Vendor (MICV) and access to the plurality of façade services is controlled by security lists designating permissions.

3. The server-based method of claim 2, wherein the security list comprises access credentials.

4. The server-based method of claim 3, wherein the access credentials comprise a user identifier and a password.

5. The server-based method of claim 1, wherein one of the plurality of façade services initiates an opt-in process.

6. The server-based method of claim 1, wherein one of the plurality of façade services initiates an opt-out process.

7. The server-based method of claim 1, wherein the first protocol is Hypertext Transfer Protocol (HTTP).

8. The server-based method of claim 1, wherein the second protocol is one of Short Message Peer-to-Peer (SMPP) or Signaling System No. 7 (SS7).

9. In a message service gateway a processor-based system on a server configured to transit a Short Message Service (SMS) message, the processor-based system comprising:
a memory; and
at least one processor coupled to the memory, the at least one processor configured to:
provide via a first protocol, and by a data processing engine of the message service gateway through a data gateway of the message gateway, a plurality of façade services to a content provider, the content provider utilizing the plurality of façade services to initiate, at the data processing engine of the message gateway, processes requested by a mobile subscriber;
perform, at the data processing engine of the message service gateway, a plurality of processing operations, responsive to a request to invoke one of the plurality of façade services, comprising:
validating, by workflow modules of the data processing engine, service arguments of the invoked façade service;
examining, by the workflow modules of the data processing engine, the service arguments, and based on the examining,
utilizing an address resolution process that leverages an address resolution facility,
using the invoked façade service and the service arguments to submit to the address resolution facility routing inquiries, resulting in receipt of routing responses for a plurality of address types in order to determine a destination Wireless Carrier (WC); and
transmitting, through another data gateway of the message gateway and, by the workflow modules of the data processing engine, at least part of the SMS message, via a second protocol, towards the destination WC, wherein the second protocol is different than the first protocol.

10. The processor-based system of claim 9, wherein the plurality of façade services are provided by a Messaging Inter-Carrier Vendor (MICV) and access to the plurality of façade services is controlled by security lists designating permissions.

11. The processor-based system of claim 10, wherein the security lists comprises access credentials.

12. The processor-based system of claim 11, wherein the access credentials comprise a user identifier and a password.

13. The processor-based system of claim 9, wherein one of the plurality of façade services initiates an opt-in process.

14. The processor-based system of claim 9, wherein one of the plurality of façade services initiates an opt-out process.

15. The processor-based system of claim 9, wherein the first protocol is Hypertext Transfer Protocol (HTTP).

16. The processor-based system of claim 9, wherein the second protocol is one of Short Message Peer-to-Peer (SMPP) or Signaling System No. 7 (SS7).

17. The server-based method of claim 1, wherein the invoked façade service hides the technical aspects related to the SMS message from the content provider.

18. The processor-based system of claim 9, wherein the invoked façade service hides the technical aspects related to the SMS message from the content provider.

19. The server based method of claim 1, wherein the examining further comprises:
   selecting, by the workflows of the data processing engine, a message delivery channel through the another data gateway of the message gateway based on dynamic constraints of the destination WC.

20. The server-based method of claim 19, wherein the dynamic constraints of the WC comprises a current day, a current time of day, Quality of Service (QOS) requirements, and a dynamically configurable set of rules.

\* \* \* \* \*